US009254692B2

(12) United States Patent
Fujimoto et al.

(10) Patent No.: US 9,254,692 B2
(45) Date of Patent: Feb. 9, 2016

(54) INKJET PRINTING APPARATUS AND INKJET PRINTING METHOD FOR MULTI-PASS PRINTING WITH COLUMN THINNING IN WHICH THE MULTI-PASS NUMBER IS NOT RESTRICTED TO BEING A MULTIPLE OF THE COLUMN THINNING NUMBER

(71) Applicant: CANON KABUSHIKI KAISHA, Tokyo (JP)

(72) Inventors: Yasunori Fujimoto, Inagi (JP); Akihiro Tomida, Kawasaki (JP); Yoshinori Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/561,588

(22) Filed: Dec. 5, 2014

(65) Prior Publication Data
US 2015/0085008 A1 Mar. 26, 2015

Related U.S. Application Data

(63) Continuation of application No. 13/749,149, filed on Jan. 24, 2013, now Pat. No. 8,931,873.

(30) Foreign Application Priority Data

Jan. 31, 2012 (JP) ................................. 2012-018351

(51) Int. Cl.
*B41J 2/205* (2006.01)
*H04N 1/60* (2006.01)
(Continued)

(52) U.S. Cl.
CPC *B41J 11/008* (2013.01); *B41J 2/07* (2013.01); *B41J 2/2132* (2013.01); *G06K 15/107* (2013.01)

(58) Field of Classification Search
CPC .......... B41J 2/465; B41J 2/2132; B41J 2/205; B41J 2/21; H04N 1/4051; H04N 1/4055
USPC ................ 347/4, 9, 12, 13, 15; 358/1.8, 3.06, 358/3.17, 502, 535
See application file for complete search history.

(56) References Cited

U.S. PATENT DOCUMENTS

| 6,183,055 B1 | 2/2001 | Kanematsu et al. |
| 6,557,964 B2 | 5/2003 | Kawatoko et al. |

(Continued)

FOREIGN PATENT DOCUMENTS

| JP | 6-135008 A | 5/1994 |
| JP | 2002-11859 A | 1/2002 |

(Continued)

OTHER PUBLICATIONS

Japanese office action issued in corresponding application No. 2012-018351 dated Dec. 1, 2015—5 pages, partial translation.

*Primary Examiner* — Hai C Pham
(74) *Attorney, Agent, or Firm* — Fitzpatrick, Cella, Harper & Scinto

(57) ABSTRACT

Provided is a printing method for multi-pass printing with column thinning in which the multi-pass number is not restricted to being a multiple of the column thinning number. A mask pattern of a size corresponding to the number of printing elements in use is prepared, and divided into blocks 1 to P. Taking R(x) to be the mask pattern for the region corresponding to block x (where x=1 to P), these P block mask patterns satisfy the following condition. Namely, for all integers s obtainable between the values from 1 to M, the arrangements of printing pixels exist in a complementary relationship with each other in the combination of mask patterns R(s), R(s+M), R(s+2M), and so on to R(s+N×M). However, for all s, N is taken to be the largest integer satisfying $s+N \times M \leq P$.

26 Claims, 18 Drawing Sheets

(51) Int. Cl.
  *B41J 11/00* (2006.01)
  *B41J 2/07* (2006.01)
  *B41J 2/21* (2006.01)
  *G06K 15/10* (2006.01)

(56) References Cited

U.S. PATENT DOCUMENTS 8,164,793 B2   4/2012  Fujita et al.
8,430,472 B2   4/2013  Nishikori et al.
8,608,271 B2   12/2013 Murayama et al.
8,931,873 B2 * 1/2015  Fujimoto et al. ............... 347/15
2002/0021319 A1  2/2002 Kawatoko et al.
2011/0187775 A1* 8/2011 Masada et al. ................. 347/12

FOREIGN PATENT DOCUMENTS

JP   2002-029097 A   1/2002
JP   2004-001560 A   1/2004
JP   4502362 A       4/2010

* cited by examiner

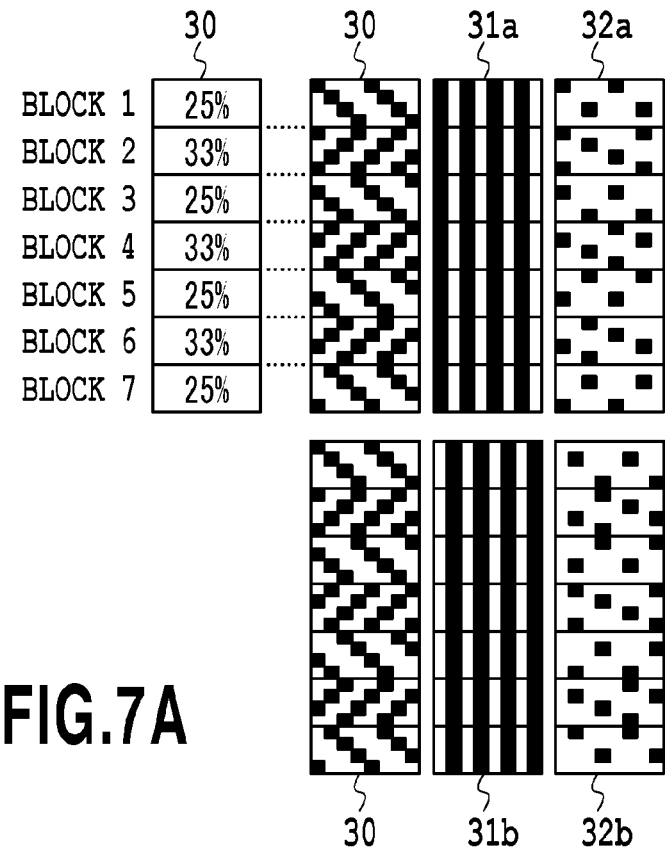
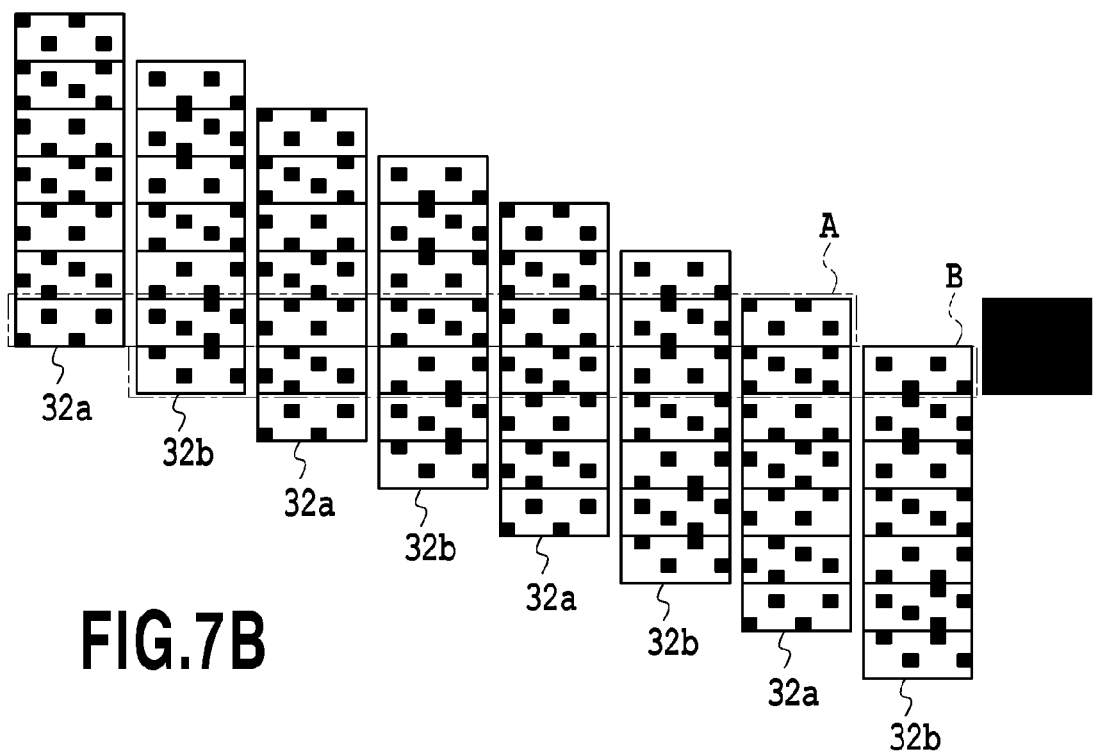
FIG.7A
FIG.7B

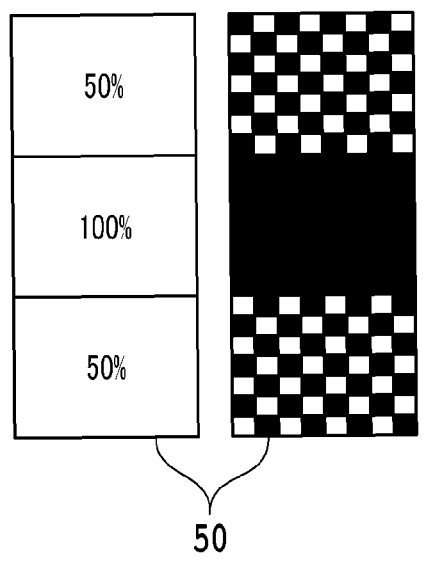 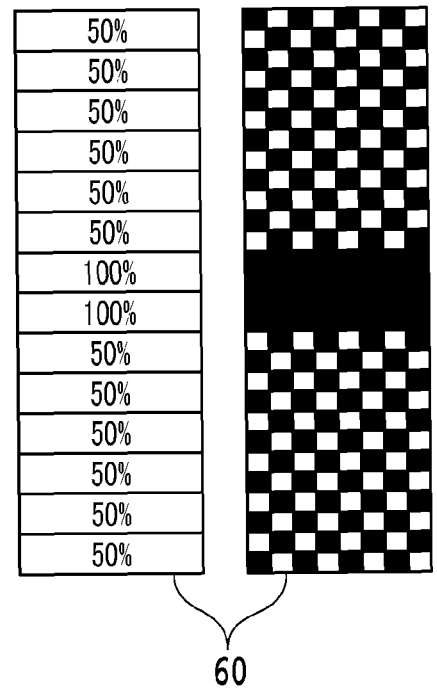
FIG.11A      FIG.11B

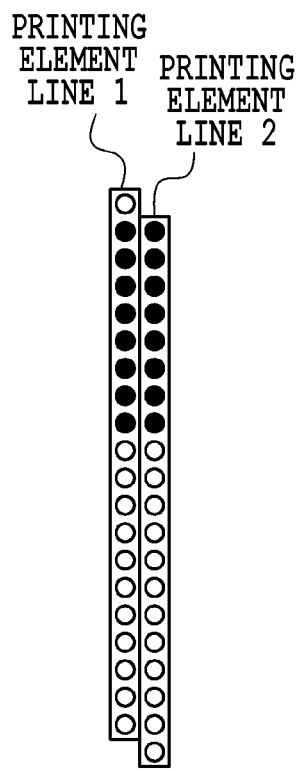
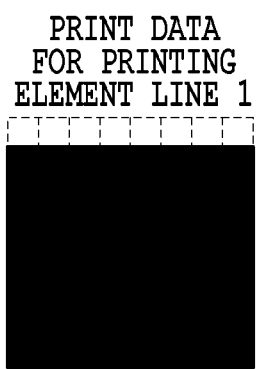
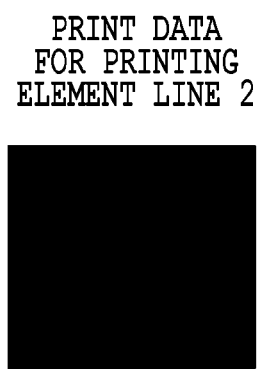
FIG.12

INKJET PRINTING APPARATUS AND INKJET PRINTING METHOD FOR MULTI-PASS PRINTING WITH COLUMN THINNING IN WHICH THE MULTI-PASS NUMBER IS NOT RESTRICTED TO BEING A MULTIPLE OF THE COLUMN THINNING NUMBER

The present application is a continuation of U.S. application Ser. No. 13/749,149, filed on Jan. 24, 2013, which claims priority to JP 2012-018351, filed Jan. 31, 2012, the entire disclosure of each of which is incorporated by reference herein.

BACKGROUND OF THE INVENTION

1. Field of the Invention

The present invention relates to a multi-pass printing method in a serial inkjet printing apparatus, and more particularly, to multi-pass printing executed jointly with column-thinning printing in which print scans are conducted while thinning data in groups of columns.

2. Description of the Related Art

A technique referred to as multi-pass printing is often implemented in serial inkjet printing apparatus that print an image by alternately conducting print scans, which move an ink-ejecting print head with respect to a print medium, and conveyance operations, which convey the print medium in a direction that crosses the print scans. With multi-pass printing, an image in the same image region is completed by multiple print scans of the print head while interposing conveyance operations which are shorter than the print width of the print head. For this reason, variation in individual printing elements and variation in conveyance operations do not become concentrated in a single location. Consequently, if multi-pass printing is conducted, the output of a uniform, high-quality image may be anticipated. On the other hand, since such multi-pass printing involves more print scans than usual, there is a problem in that the print time increases significantly.

In contrast, a printing method called column thinning is disclosed in Japanese Patent Laid-Open No. 2002-29097 and Japanese Patent Laid-Open No. 2004-1560, for example. Column thinning is a printing method in which a print head is moved with respect to pixel columns arrayed in the main scan direction of the print head while periodically conducting ejection operations on only a thinned subset of pixel columns. Thus, in the case of column thinning, the ejection operations in each print scan are conducted at a lower pixel density than the pixel density by which pixels are actually arrayed.

If such column thinning is conducted, it is possible to print images of higher resolution than the resolution printable with individual print scans. Also, in the case where the translational velocity of the print head is determined by an upper limit on the ejection frequency of the printing elements, it is possible to increase the translational velocity in the main scan direction while in a state where an upper limit value on the print head ejection frequency has been set. In other words, multi-pass printing with column thinning makes it possible to output images in less time than multi-pass printing without column thinning.

FIGS. 17A and 17B illustrate printing states in 4-pass multi-pass printing with 2-column thinning. For the sake of simplicity, the case of a print head with 16 printing elements will be described herein. Referring to FIG. 17A, a prepared mask pattern 10 is 16 pixels tall, which is equal to the number of printing elements in the print head, and 8 pixels wide.

Herein, pixels illustrated as black represent print allowed pixels where the printing of a dot is allowed, whereas pixels illustrated as white represent print non-allowed pixels where the printing of a dot is not allowed. In the case of 4-pass multi-pass printing, the mask pattern 10 is divided into four blocks 1 to 4 which correspond to four printing elements each, and which exist in a complementary relationship with each other regarding the arrangement of print allowed pixels and print non-allowed pixels. The print allowed ratio of each block is 50%.

In the case of 2-column thinning, scans that print on odd columns 11a and scans that print on even columns 11b are repeated in alternation. Thus, in practice, from among the pixels whose printing is allowed by the mask pattern 10, a pixel pattern 12a corresponding to the odd columns 11a is printed by odd scans, and a pixel pattern 12b corresponding to the even columns 101 is printed by even scans.

FIG. 17B illustrates how an image is printed on a print medium by the above 4-pass multi-pass printing. The print scans alternately print in accordance with the pixel patterns 11a and 11b, and conveyance operations equivalent to four pixels (16 pixels/4 passes) are conducted between each print scan. Take the region A of the print medium. In this region, printing is conducted in the following order: odd column scan according to the pixel pattern 11a, even column scan according to the pixel pattern 11b, odd column scan according to the pixel pattern 11a, and even column scan according to the pixel pattern 11b. Meanwhile, in the region B adjacent to the region A, printing is conducted in the following order: even column scan according to the pixel pattern 11b, odd column scan according to the pixel pattern 11a, even column scan according to the pixel pattern 11b, and odd column scan according to the pixel pattern 11a. Although the order of odd scans and even scans differs, the regions A and B are alike in that an image is printed by two odd column scans according to the pixel pattern 11a and two even column scans according to the pixel pattern 11b. Additionally, an image is printed according to the same order as either the region A or the region B in all regions of the print medium.

In this way, in 4-pass multi-pass printing with 2-column thinning, a mask pattern with a print allowed ratio of 50% (100%/2) is prepared such that 2-pass printing can be respectively conducted for odd columns and even columns. If such a mask pattern is prepared, then 4-pass multi-pass printing can be conducted in all regions by respectively conducting 2-pass multi-pass printing on the odd columns and the even columns.

To explain in more general terms, in multi-pass printing with M-column thinning of the related art, a mask pattern with a print allowed ratio of 100%/N is prepared such that N-pass printing can be conducted on individual columns. Then, M×N-pass multi-pass printing can be conducted in all image regions by conducting N-pass multi-pass printing on M groups of columns.

However, with methods of the related art as discussed above, the number of passes on the same image region is restricted to being a value that is a multiple of the column thinning number M. For example, in the case where the column thinning number M=2 as in FIGS. 17A and 17B, the multi-pass number on the same image region must be an even number (2×N), and multi-pass printing with an odd number of passes cannot be realized. Additionally, in the case where the column thinning number M=4, the multi-pass number on the same image region must be a multiple of 4, and printing with other numbers of passes cannot be conducted.

Setting the multi-pass number in an inkjet printing apparatus to a suitable value is important for maintaining a balance between image quality and printing speed, and the existence of restrictions of the multi-pass number as discussed above is undesirable.

SUMMARY OF THE INVENTION

The present invention has been devised in order to solve the above problems. Thus, it is an objective thereof to provide a printing method for multi-pass printing with column thinning in which the multi-pass number s is not restricted to being a multiple of the column thinning number.

In a first aspect of the present invention, there is provided an inkjet printing apparatus comprising: means for preparing a mask pattern that defines print allowed pixels where the printing of a dot is allowed, and print non-allowed pixels, where the printing of a dot is not allowed, and which correspond to each of blocks 1 to P obtained by dividing into P divisions a printing element line in which printing elements that eject ink are arranged in a sub-scan direction; print scanning means that repeatedly executes print scans to print M columns (where M is an integer smaller than P and not a divisor of P) by executing M times print scans each of which prints a different column of M columns in succession according to the mask pattern while moving the printing element lines in a main scan direction crossing the sub-scan direction; and conveying means that conveys a print medium in the sub-scan direction by a distance equivalent to one of the blocks between the print scans; wherein in the mask pattern corresponding to each of the P blocks, the arrangements of the print allowed pixels exist in a complementary relationship with each other in combination of mask patterns corresponding to $(s+N \times M)$-th block, where s is integer satisfying $(1 \leq s \leq M)$ and N is integer equal to or more than 1 and satisfying $(s+N \times M \leq P)$.

In a second aspect of the present invention, there is provided an inkjet printing method for an inkjet printing apparatus comprising steps of: preparing a mask pattern that defines print allowed pixels where the printing of a dot is allowed, and print non-allowed pixels, where the printing of a dot is not allowed, and which correspond to each of blocks 1 to P obtained by dividing into P divisions a printing element line in which printing elements that eject ink are arranged in a sub-scan direction; repeatedly executing print scans to print M columns (where M is an integer smaller than P and not a divisor of P) by executing M times print scans each of which prints a different column of M columns in succession according to the mask pattern while moving the printing element lines in a main scan direction crossing the sub-scan direction; and conveying a print medium in the sub-scan direction by a distance equivalent to one of the blocks between the print scans; wherein in the mask pattern corresponding to each of the P blocks, the arrangements of the print allowed pixels exist in a complementary relationship with each other in combination of mask patterns corresponding to $(s+N \times M)$-th block, where s is integer satisfying $(1 \leq s \leq M)$ and N is integer equal to or more than 1 and satisfying $(s+N \times M \leq P)$.

Further features of the present invention will become apparent from the following description of exemplary embodiments (with reference to the attached drawings).

BRIEF DESCRIPTION OF THE DRAWINGS

FIGS. 7A and 7B illustrate states of multi-pass printing in the second embodiment;

FIGS. 11A and 11B illustrate another example of allowed printing ratio distributions in a mask pattern;

FIG. 12 is a schematic diagram illustrating a Y displacement correction method;

DESCRIPTION OF THE EMBODIMENTS

Figure 1:
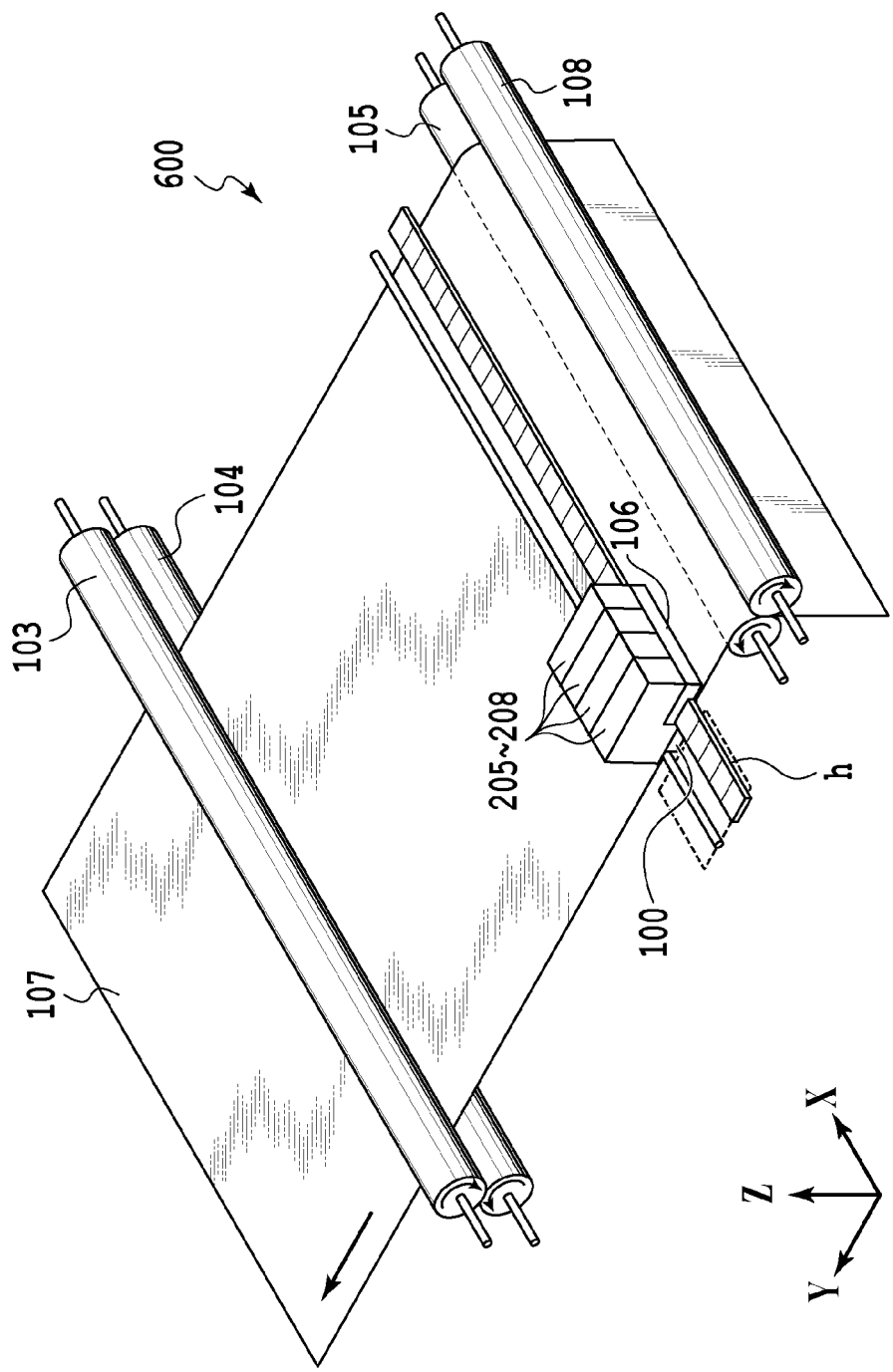
FIG. 1 is a schematic perspective view illustrating a configuration of a printing unit in a serial inkjet printing apparatus.

FIG. 1 is a schematic perspective view illustrating a configuration of a printing unit in a serial inkjet printing apparatus 600 usable with the present invention. In a print head 100 attached to a carriage 106, multiple printing element lines corresponding to different types of ink are disposed in parallel along the X direction (main scan direction). In the individual printing element lines, multiple printing elements for ejecting ink are arranged in the Y direction. Ink tanks 205 to 208 for supplying ink to the respective printing element lines are mounted onto the carriage 106, with the carriage 106 able to move in the X direction in this state. A single print scan is conducted as a result of the print head 100 ejecting ink towards a print medium 107 at a given frequency while the carriage 106 moves at a given velocity.

A conveying roller pair which includes a conveying roller 104 and an auxiliary roller 103 as well as a conveying roller pair which includes a conveying roller 105 and an auxiliary roller 108 hold the print medium 107 upstream and downstream to the carriage 106 in the Y direction (sub-scan direction). As a result of being held by these two roller pairs, the surface of the print medium 107 facing the print head 100 is kept smooth.

When a single print scan by the print head 100 is completed, the conveying rollers 104 and 105 rotate, and the print medium 107 is conveyed a predetermined distance in the sub-scan direction (Y direction) crossing the main scan direction. Additionally, when the conveyance operation ends, the carriage 106 once again moves in the X direction, and the next print scan is conducted by the print head 100. By alternately repeating print scans and conveyance operations as above, an image is gradually printed on the print medium 107.

When printing operations on a print medium are not being conducted, the carriage 106 stands by in a home position h outside the printing region.

Figure 2:
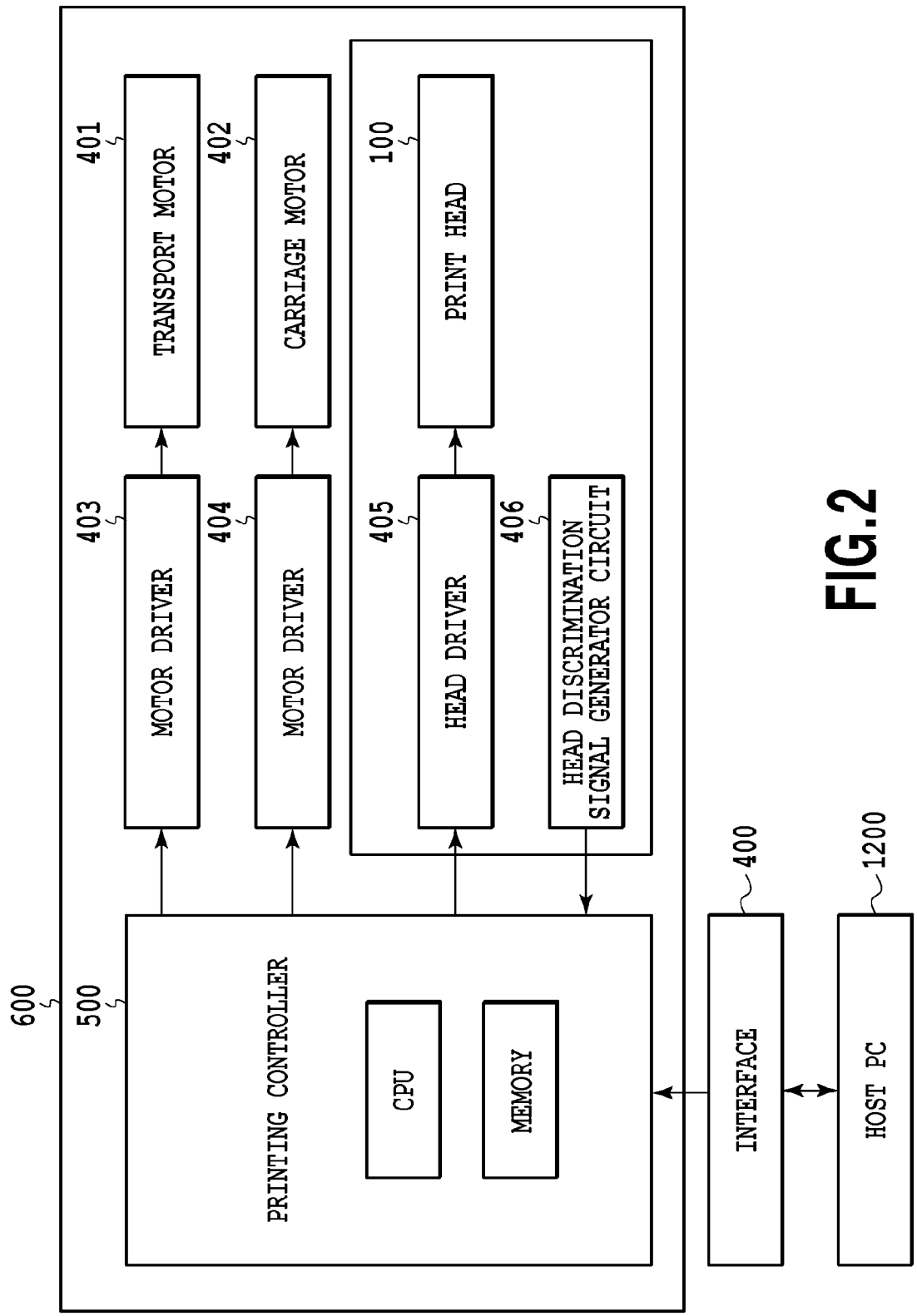
FIG. 2 is a block diagram illustrating a control configuration in an inkjet printing apparatus.

FIG. 2 is a block diagram illustrating a control configuration in the inkjet printing apparatus 600 of the embodiment. A printing controller 500 drives a conveying motor 401 for rotating the conveying rollers 104 and 105 by controlling a motor driver 403. Also, by controlling a motor driver 404, the printing controller 500 drives a carriage motor 402 for moving the carriage 106 in the X direction. Additionally, by controlling a head driver 405, the printing controller 500 ejects ink from the print head 100 to form dots on a print medium. Image data required to eject ink is input into the printing controller 500 from an externally connected PC 1200 via an interface 400. The printing controller 500 is equipped with components such as a CPU and memory, applies predetermined image processing to received image data, and generates ejection data by which the print head 100 ejects ink in each print scan.

A head discrimination signal generator circuit 406 acquires type, number, or other information regarding the print head 100, and supplies this information to the printing controller 500.

Figure 3:
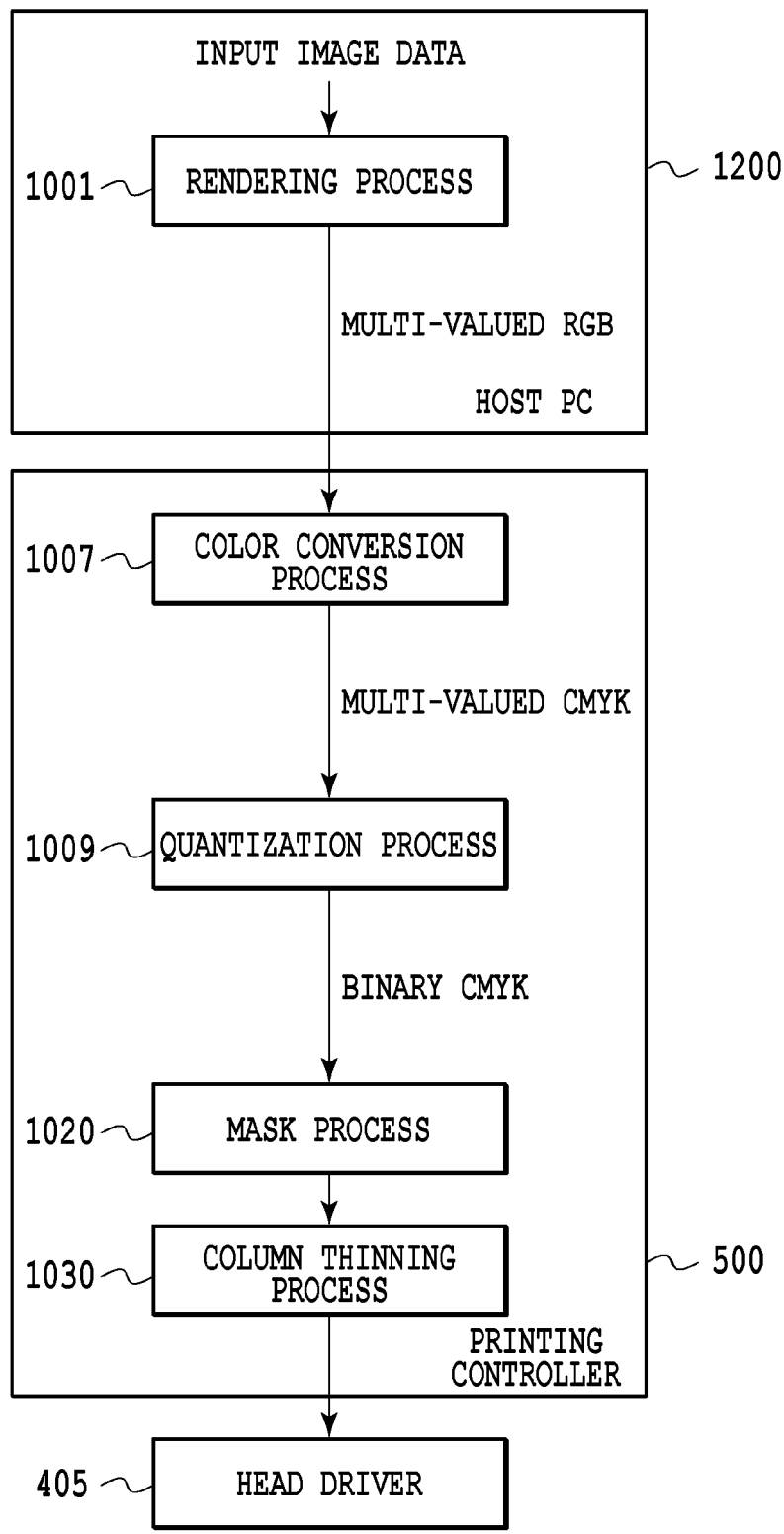
FIG. 3 is a function block diagram of an image processing system.

FIG. 3 is a function block diagram of an image processing system realized by a printer driver installed in the host PC 1200 and the printing controller 500 in the inkjet printing apparatus 600.

In the host PC 1200, a rendering process 1001 is executed on image data generated by an application, and 1200 dpi multi-valued RGB data is generated. After that, the RGB data is transferred to the printing controller 500 via the interface 400.

In the printing controller 500, a color conversion process 1007 is performed on the input RGB data, and the multi-valued RGB data is converted into multi-valued CMYK data corresponding to the ink colors used by the printing apparatus. After that, the 1200 dpi multi-valued CMYK data is converted into 1200 dpi binary CMYK data by a quantization process 1009. An established error diffusion, dithering, or other technique may be used as the quantization technique at this point.

The binary CMYK data is subsequently subjected to a mask process 1020, the logical product is taken with a mask pattern stored in memory, and printing pixels for the next print scan are determined. After that, a column thinning process 1030 is performed, and after predetermined column data is separated out, the result is transferred to the head driver 405 as print data for the next print scan.

The print head 100 executes a single print scan according to such print data. The column thinning process 1030 generates print data such that different column data is sequentially extracted for each print scan.

In the present invention, an inkjet printing apparatus as described above is used to conduct P-pass multi-pass printing according to a mask pattern while conducting M-column thinning that prints dots at a period of M columns. In this case, M is an integer equal to or greater than 2, while P is an integer that is greater than M but not a multiple of M. Hereinafter, a printing method and image processing characteristic of the present invention which are executed by the mask process 1020 and the column thinning process 1030 will be described.

First Embodiment

In this embodiment, multi-pass printing with a column thinning number M=2 and a multi-pass number P=5 will be described.

Figure 4A:
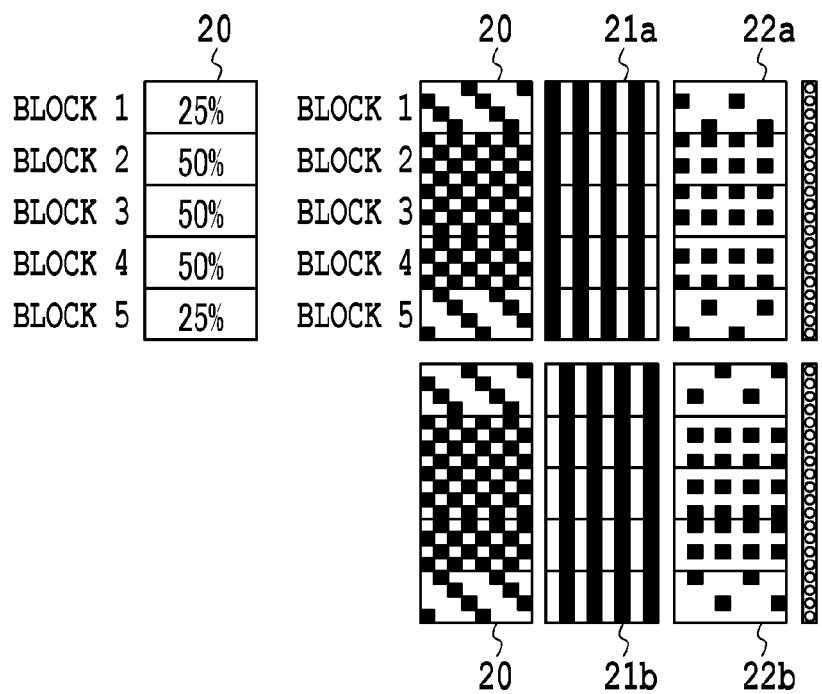
FIGS. 4A and 4B illustrate states of multi-pass printing in the first embodiment.
Figure 4B:
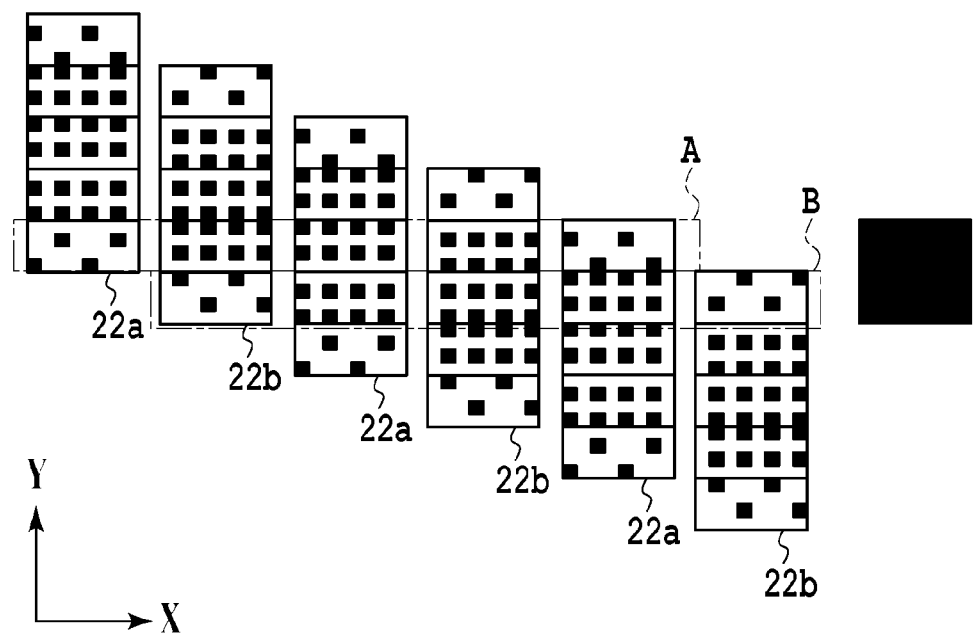
Figure 17A:
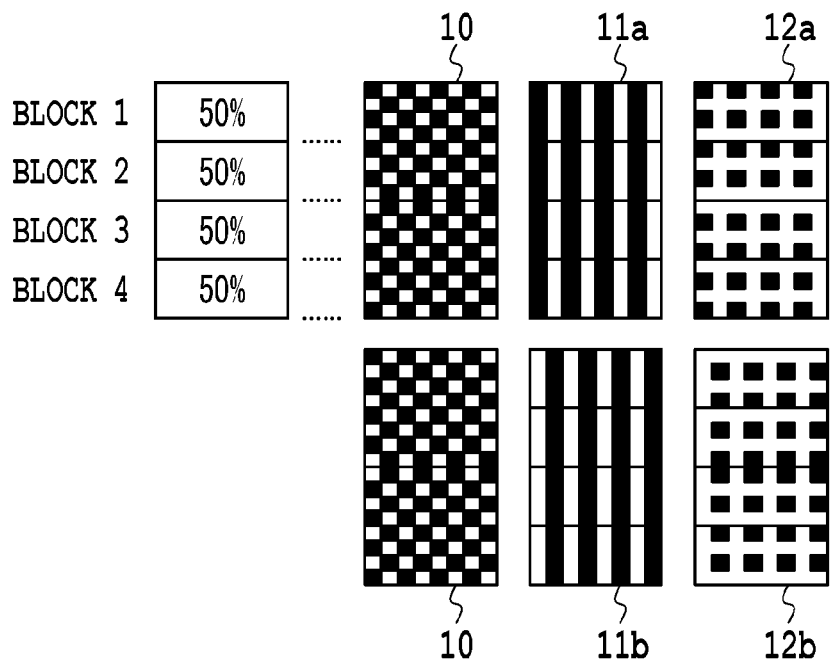
FIGS. 17A and 17B illustrate states of multi-pass printing with 2-column thinning.
Figure 17B:
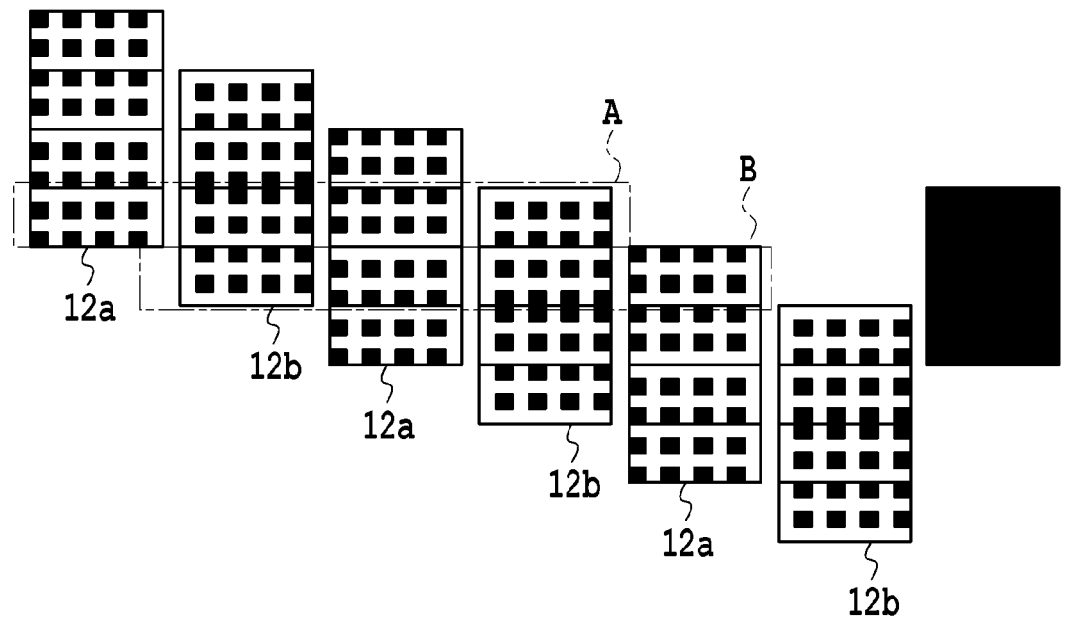

FIGS. 4A and 4B will be used to illustrate printing states of multi-pass printing in this embodiment, in comparison to FIGS. 17A and 17B. Herein, the case of a print head equipped with 20 printing elements is illustrated, with the mask pattern 20 being 20 pixels tall and 8 pixels wide. In the mask pattern 20, pixels illustrated as black represent printing pixels where the printing of a dot is allowed, whereas pixels illustrated as white represent non-printing pixels where the printing of a dot is not allowed. In the case of 5-pass multi-pass printing, the mask pattern 20 is divided into five blocks which correspond to four printing elements each. The print allowed ratio s in the individual blocks herein are 25% for the first block, 50% for the second through fourth blocks, and 25% for the fifth block.

In the case of 2-column thinning, pixel lines to be printed are separately printed as odd pixel lines (odd columns) 21a and even pixel lines (even columns) 21b, as discussed with FIGS. 17A and 17B. For this reason, print scans are repeated alternating between scans that print on odd columns 21a and scans that print on even columns 21b. Thus, in practice, from among the pixels whose printing is allowed by the mask pattern 20, a pixel pattern 22a corresponding to the odd columns 21a is printed by odd scans, and a pixel pattern 22b corresponding to the even columns 21b is printed by even scans.

FIG. 4B illustrates how an image is printed on a print medium by 5-pass multi-pass printing. The print scans are alternated in accordance with the pixel patterns 22a and 22b, and conveyance operations equivalent to four pixels (20 pixels/5 passes) are conducted between the print scans.

Take the region A of the print medium. In this region, printing is conducted in the following order: block 5 with pixel pattern 22a, block 4 with pixel pattern 22b, block 3 with pixel pattern 22a, block 2 with pixel pattern 22b, and block 1 with pixel pattern 22a. In other words, in the region A, an image is printed by three odd column scans using blocks 1, 3, and 5, as well as two even column scans using blocks 2 and 4. In contrast, in the region B adjacent to the region A, printing is conducted in the following order: block 5 with pixel pattern 22b, block 4 with pixel pattern 22a, block 3 with pixel pattern 22b, block 2 with pixel pattern 22a, and block 1 with pixel pattern 22b. In other words, in the region B, an image is printed by two odd column scans using blocks 2 and 4, as well as three even column scans using blocks 1, 3, and 5. In this way, although the number of scans in which odd column data is printed and the number of scans in which even column data is printed differ between the regions A and B, in both cases 100% of the odd column data and 100% of the even column data can be printed. In this way, according to this Embodiment, normal multi-pass printing can be realized even in the case where the multi-pass number (P=5) is not a multiple of the column thinning number (M=2).

Although the print allowed ratios for the blocks 1 to 5 are taken to be 25%, 50%, 50%, 50%, and 25% in the example in FIGS. 4A and 4B, the distribution of print allowed ratios in the mask pattern is not limited to such values. The distribution of print allowed ratio may be any type of mask pattern insofar as a complementary relationship (i.e., a print allowed ratio of 100%) is obtained by the three blocks 1, 3, and 5, and a complementary relationship (i.e., a print allowed ratio of 100%) is obtained by the two blocks 2 and 4.

Figure 5A:
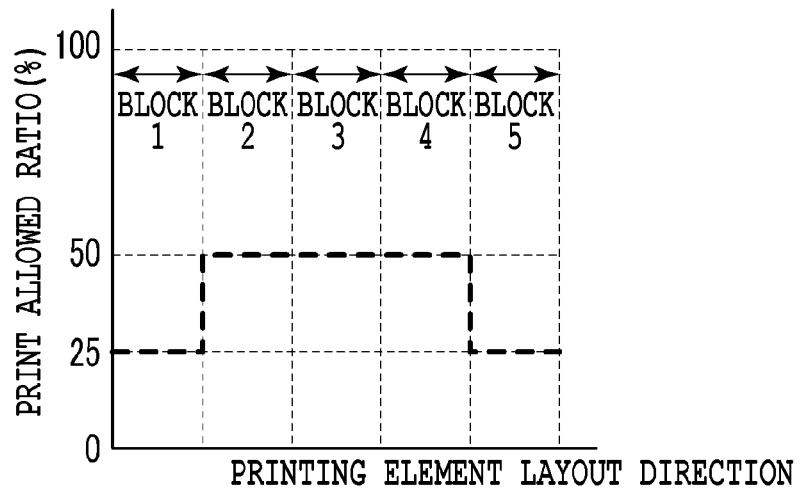
FIGS. 5A to 5C illustrate exemplary distributions of allowed printing ratios in a mask pattern.
Figure 5B:
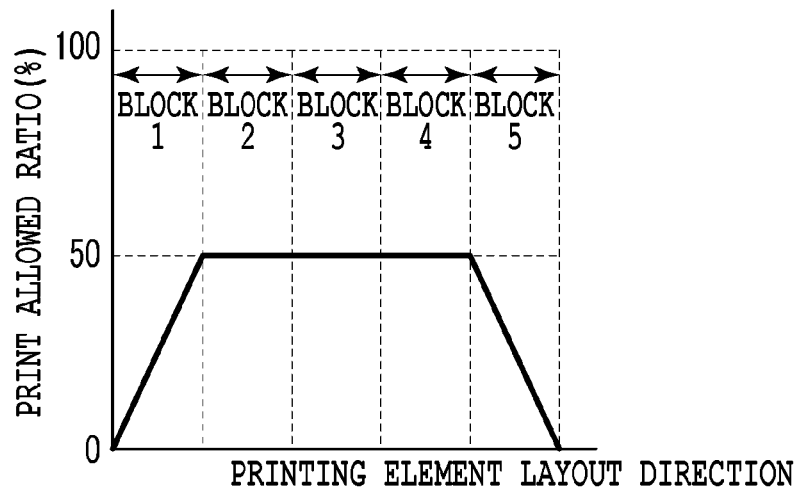
Figure 5C:
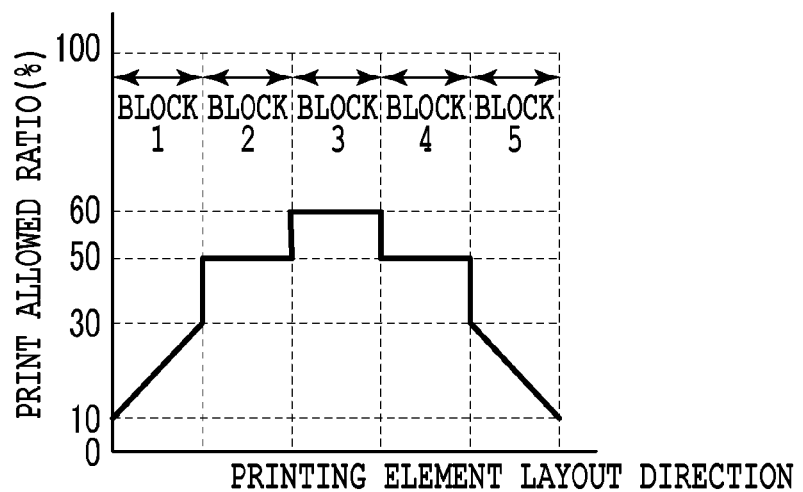

FIGS. 5A to 5C illustrate exemplary distributions of print allowed ratios in a mask pattern usable with this Embodiment. FIG. 5A illustrates the distribution of print allowed ratios for the mask pattern 20 described with FIG. 4A, in which the print allowed ratio of blocks 1 to 5 are 25%, 50%, 50%, 50%, and 25%. In contrast, FIGS. 5B and 5C illustrate examples in which edge blocks such as the block 1 and the block 5 have a print allowed ratio that is lowest near the edges and gradually increases as one proceeds towards the center.

Setting such print allowed ratios has the advantage of alleviating image defects, particularly connection stripes, in serial printing apparatuses.

Figure 6:
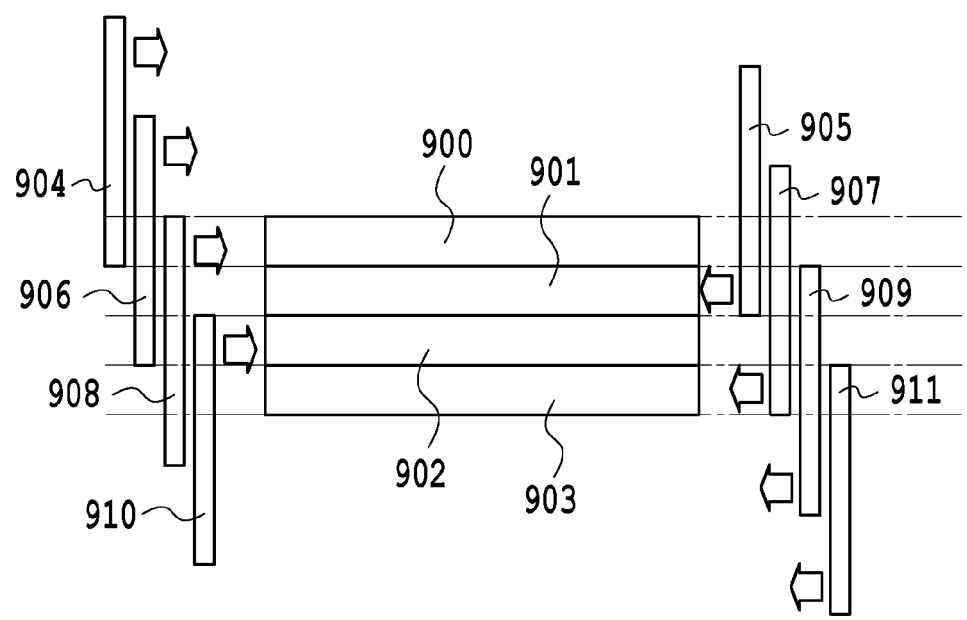
FIG. 6 is a schematic diagram illustrating how connection stripes occur.

FIG. 6 is a schematic diagram illustrating how connection stripes occur. Illustrated herein is an example in which 5-pass multi-pass as in this Embodiment is conducted bi-directionally. In the case of such 5-pass multi-pass printing, an image is completed by five print scans each in respective image regions 900 to 903. Specifically, an image is printed by the print scans 904 to 908 in the image region 900, while an image is printed by the print scans 905 to 909 in the image region 901, for example. Conveyance operations of a magnitude equivalent to the width of an image region are conducted between each of the print scans 904 to 911. However, in cases where error is produced in these conveyance operations, a white line or a black line appears at the seam between image regions, which may result in image defects. Thus, in multi-pass printing of the related art, mask patterns which keep a low print allowed ratio in the regions corresponding to the seams have been proposed in order to make such connection stripes less noticeable.

FIG. 5B illustrates a distribution of print allowed ratios in a mask pattern created in order to address connection stripes better than FIG. 5A. Even with a distribution of address s as in FIG. 5B, a complementary relationship (i.e., a print allowed ratio of 100%) is obtained by the three blocks 1, 3, and 5, and a complementary relationship is obtained by the two blocks 2 and 4. In other words, 5-pass multi-pass printing with 2-column thinning can be realized.

However, uneven glossiness over the image has been confirmed if the print allowed ratio changes sharply inside a single block as in FIG. 5B, particularly in the case of using pigment-based inks. In order to avoid this, it is necessary to make the print allowed ratio change more gradually in the edge blocks.

FIG. 5C illustrates a distribution of print allowed ratios in a mask pattern created in order to address connection stripes better than FIG. 5A while also addressing uneven glossiness better than FIG. 5B. Even with a distribution of print allowed ratios as in FIG. 5C, a complementary relationship (i.e., a print allowed ratio of 100%) is obtained by the three blocks 1, 3, and 5, and a complementary relationship is obtained by the two blocks 2 and 4. In other words, 5-pass multi-pass printing with 2-column thinning can be realized.

Table 1 illustrates the results of rating the degree of connection stripes and uneven glossiness in the case of conducting 5-pass printing with 2-column thinning while respectively using mask patterns with the allowed printing ratios indicated in FIGS. 5A to 5C. Note that these ratings were made by printing a 100% image on photo glossy paper using a black pigment-based ink.

TABLE 1

|  | A | B | C |
| --- | --- | --- | --- |
| Connection stripes | Satisfactory | Good | Good |
| Uneven glossiness | Good | Satisfactory | Good |

According to Table 1, if a mask pattern having the print allowed ratios in FIG. 5C is used, it becomes possible to output a high-quality image with improvement in connection stripes and uneven glossiness by conducting 5-pass multi-pass printing with 2-column thinning.

As described above, according to this Embodiment, it becomes possible to realize 5-pass multi-pass printing with 2-column thinning by using a mask pattern in which a complementary relationship is obtained by the blocks 1, 3, and 5, and a complementary relationship is obtained by the blocks 2 and 4.

Second Embodiment

In this embodiment, multi-pass printing with a column thinning number M=2 and a multi-pass number P=7 will be described.

FIGS. 7A and 7B will be used to illustrate printed states of multi-pass printing in this embodiment, similarly to FIGS. 4A and 4B. Herein, the case of a print head equipped with 28 printing elements is illustrated, with the mask pattern 30 being 28 pixels tall and 8 pixels wide. In the case of 7-pass multi-pass printing, the mask pattern 30 is divided into seven blocks which correspond to four printing elements each. The blocks are in a complementary relationship with each other. The print allowed ratios in the individual blocks herein are 25% for the first, third, fifth, and seventh blocks, and 33.3% for the second, fourth, and sixth blocks.

In the case of 2-column thinning, from among the pixels whose printing is allowed by the mask pattern 30, a pixel pattern 32a corresponding to the odd columns 31a is printed by odd scans, and a pixel pattern 32b corresponding to the even columns 31b is printed by even scans.

FIG. 7B illustrates how an image is printed on a print medium by 7-pass multi-pass printing using the above mask pattern 30. The print scans are alternated in accordance with the pixel patterns 32a and 32b, and conveyance operations equivalent to four pixels (28 pixels/7 passes) are conducted between the individual print scans.

Herein, in the region A, an image is printed by four odd column scans using blocks 1, 3, 5, and 7, as well as three even column scans using blocks 2, 4, and 6. In contrast, in the region B adjacent to the region A, an image is printed by three odd column scans using blocks 2, 4, and 6, as well as four even column scans using blocks 1, 3, 5, and 7. In this way, although the number of scans in which odd column data is printed and the number of scans in which even column data is printed differ between the regions A and B, in both cases 100% of the odd column data and 100% of the even column data can be printed. In other words, according to this Example, multi-pass printing in which the multi-pass number (P=7) is not a multiple of the column thinning number (M=2) can be realized.

Note that in this embodiment, the distribution of print allowed ratios in the mask pattern may also be variously modified, similarly to the first embodiment.

Figure 8A:
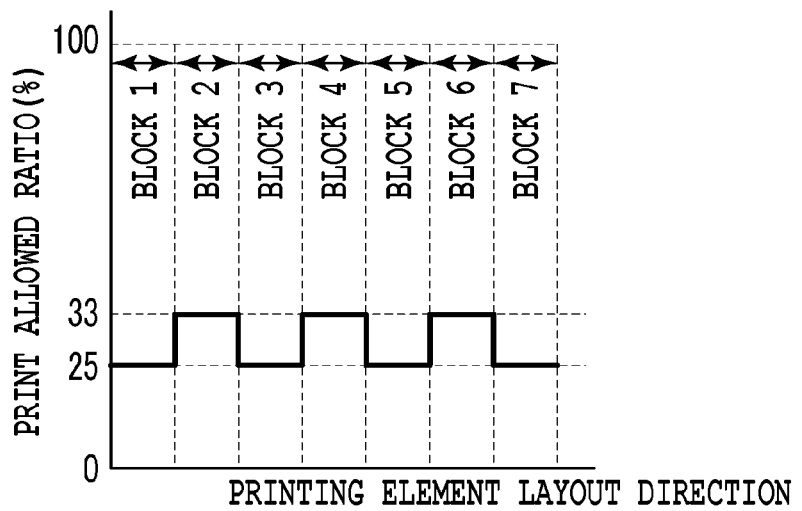
FIGS. 8A to 8C illustrate exemplary distributions of allowed printing ratios in a mask pattern.
Figure 8B:
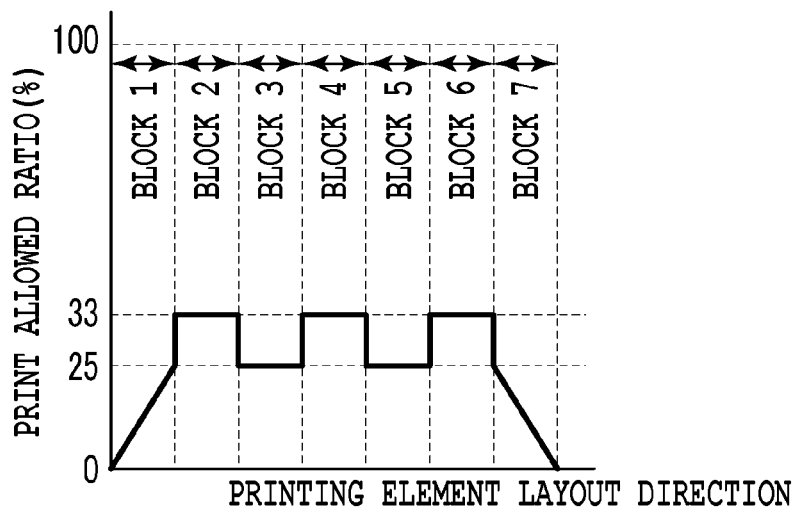
Figure 8C:
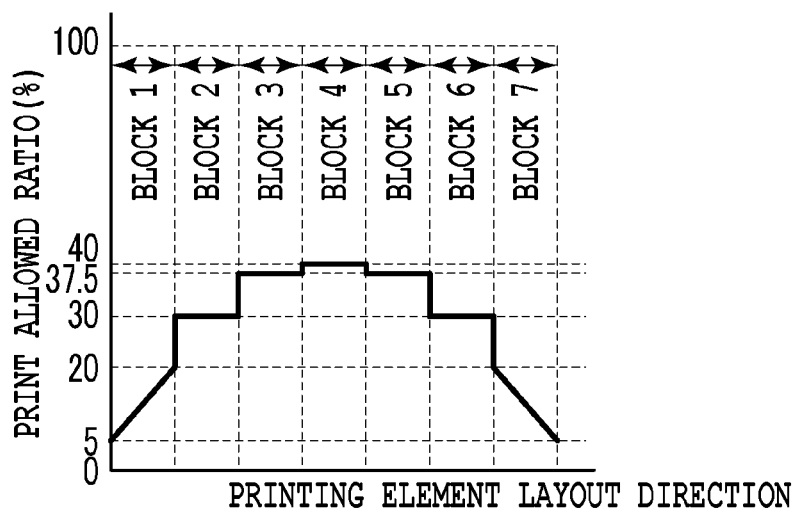

FIGS. 8A to 8C illustrate exemplary distributions of print allowed ratios in a mask pattern usable with this embodiment. FIG. 8A illustrates the mask pattern 30 described with FIG. 7A. In contrast, FIGS. 8B and 8C illustrate examples in which the print allowed ratios near the edges are kept low in order to alleviate image defects, particularly connection stripes, similarly to the first embodiment.

Similarly to the first embodiment, FIG. 8B illustrates a distribution of print allowed ratios in a mask pattern created in order to address connection stripes better than FIG. 8A. Also, FIG. 8C illustrates a distribution of print allowed ratios in a mask pattern created in order to address connection stripes better than FIG. 8A while also addressing uneven glossiness better than FIG. 8B. Additionally, the results of evaluating the degree of connection stripes and uneven glossiness in the case of conducting 7-pass printing with 2-column thinning while respectively using the mask patterns indicated in FIGS. 8A to 8C are similar to Table 1 in the first embodiment.

As described above, according to this embodiment, it is possible to conduct 7-pass multi-pass printing with 2-column thinning by preparing a mask pattern 30 in which a complementary relationship is obtained by the blocks 1, 3, 5, and 7, and a complementary relationship is obtained by the blocks 2, 4, and 6.

Third Embodiment

In this embodiment, multi-pass printing with a column thinning number M=4 and a multi-pass number P=10 will be described.

Figure 9A:
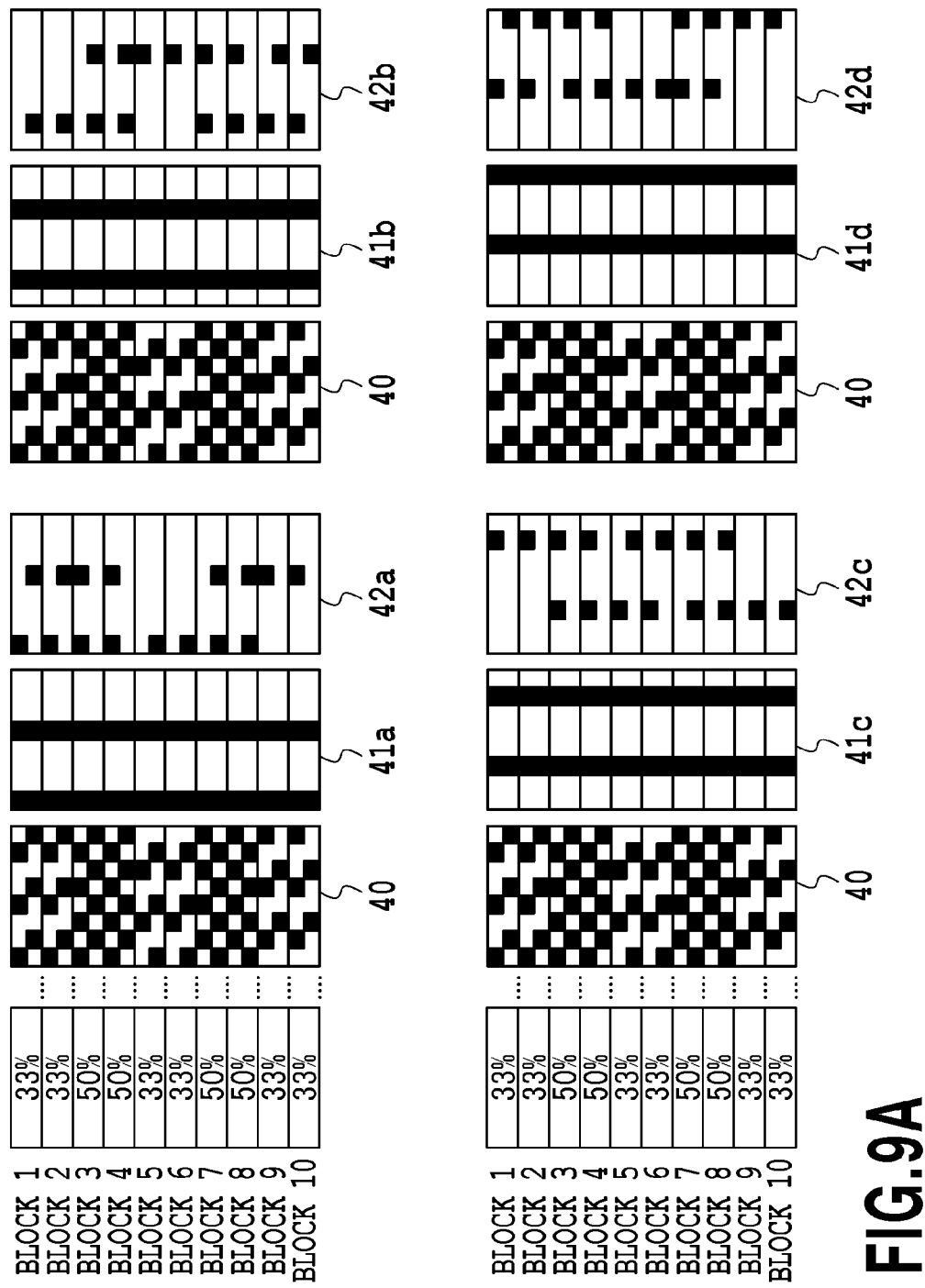
FIGS. 9A and 9B illustrate states of multi-pass printing in the third embodiment.
Figure 9B:
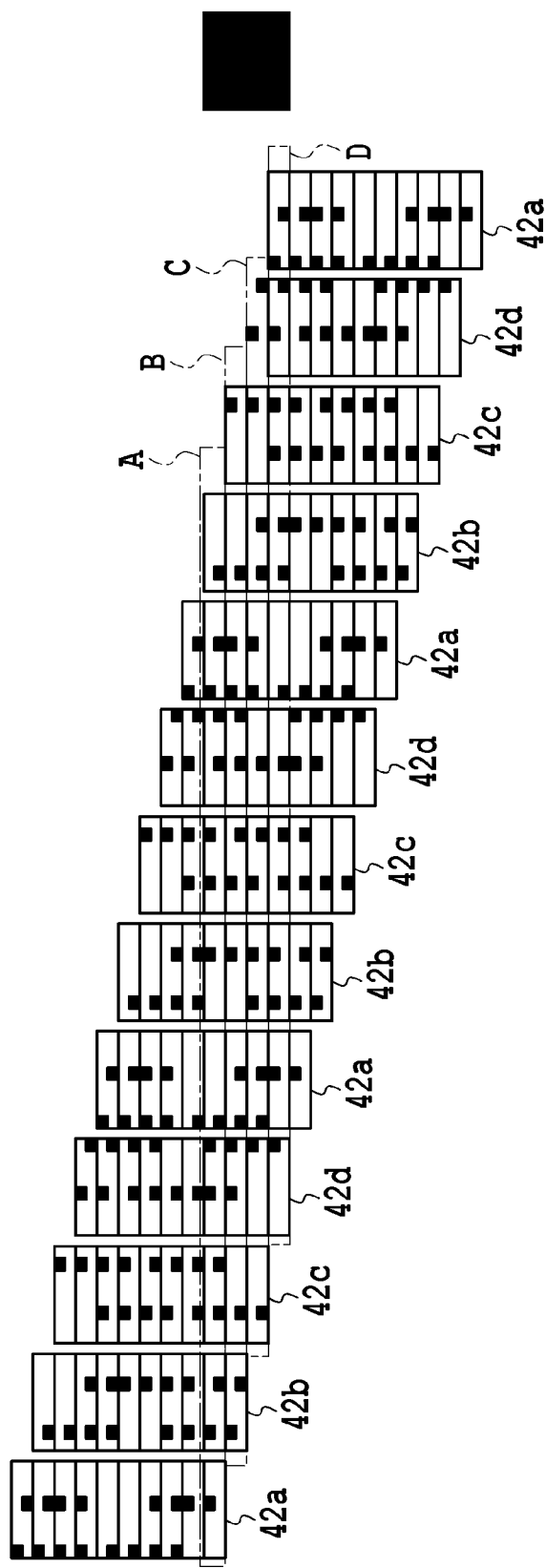

FIGS. 9A and 9B will be used to illustrate printed states of multi-pass printing in this embodiment, similarly to FIGS. 4A and 4B. Herein, the case of a print head equipped with 20 printing elements is illustrated, with the mask pattern 40 being 20 pixels tall and 8 pixels wide. In the case of 10-pass multi-pass printing, the mask pattern 40 is divided into ten blocks which correspond to two printing elements each. The print allowed ratios in the individual blocks herein are 33% for the first, second, fifth, sixth, ninth, and tenth blocks, and 50% for the third, fourth, seventh, and eighth blocks.

In the case of 4-column thinning, from among the pixels whose printing is allowed by the mask pattern 40, a pixel pattern 42a corresponding to 1st columns 41a is printed by 1st column scans, and a pixel pattern 42b corresponding to 2nd columns 41b is printed by 2nd column scans. Additionally, a pixel pattern 42c corresponding to 3rd columns 41c is printed by 3rd column scans, and a pixel pattern 42d corresponding to 4th columns 41d is printed by 4th column scans.

FIG. 9B illustrates how an image is printed on a print medium by 10-pass multi-pass printing using the above mask pattern 40. The print scans are conducted in order according to the pixel patterns 42a, 42b, 42c, and 42d, and conveyance operations equivalent to two pixels (20 pixels/10 passes) are conducted between the individual print scans.

Herein, in the region A, an image is printed by three 1st column scans using blocks 1, 5, and 9, three 2nd column scans using blocks 2, 6, and 10, two 3rd column scans using blocks 3 and 7, and two 4th column scans using blocks 4 and 8. In contrast, in the region B adjacent to the region A, an image is printed by three 2nd column scans using blocks 1, 5, and 9, three 3rd column scans using blocks 2, 6, and 10, two 4th column scans using blocks 3 and 7, and two 1st column scans using blocks 4 and 8. Also, in the region C adjacent to the region B, an image is printed by three 3rd column scans using blocks 1, 5, and 9, three 4th column scans using blocks 2, 6, and 10, two 1st column scans using blocks 3 and 7, and two 2nd column scans using blocks 4 and 8. Furthermore, in the region D adjacent to the region C, an image is printed by three 4th column scans using blocks 1, 5, and 9, three 1st column scans using blocks 2, 6, and 10, two 2nd column scans using blocks 3 and 7, and two 3rd column scans using blocks 4 and 8.

In this way, although the number of scans in which data is printed for individual 1st to 4th columns differ from each other in the regions A, B, C, and D, in all cases 100% of the 1st column data, 100% of the 2nd column data, 100% of the 3rd column data, and 100% of the 4th column data can be printed. In other words, according to this embodiment, multi-pass printing in which the multi-pass number (P=10) is not a multiple of the column thinning number (M=4) can be realized.

Note that in this embodiment, the distribution of print allowed ratios in the mask pattern may also be variously modified, similarly to the earlier embodiments.

Figure 10A:
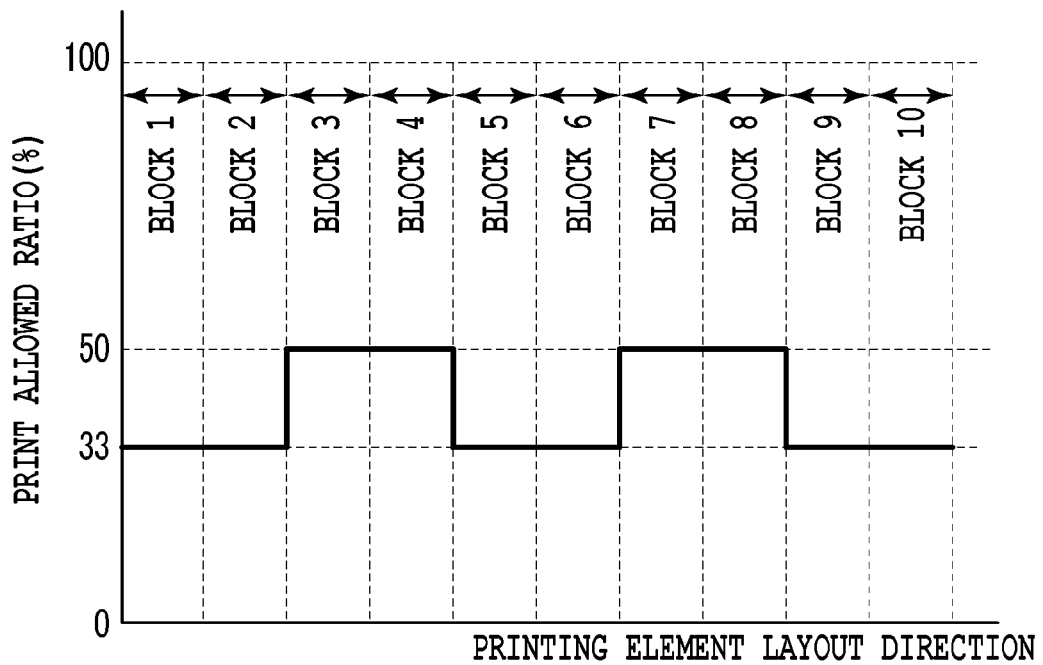
FIGS. 10A and 10B illustrate exemplary distributions of allowed printing ratios in a mask pattern.
Figure 10B:
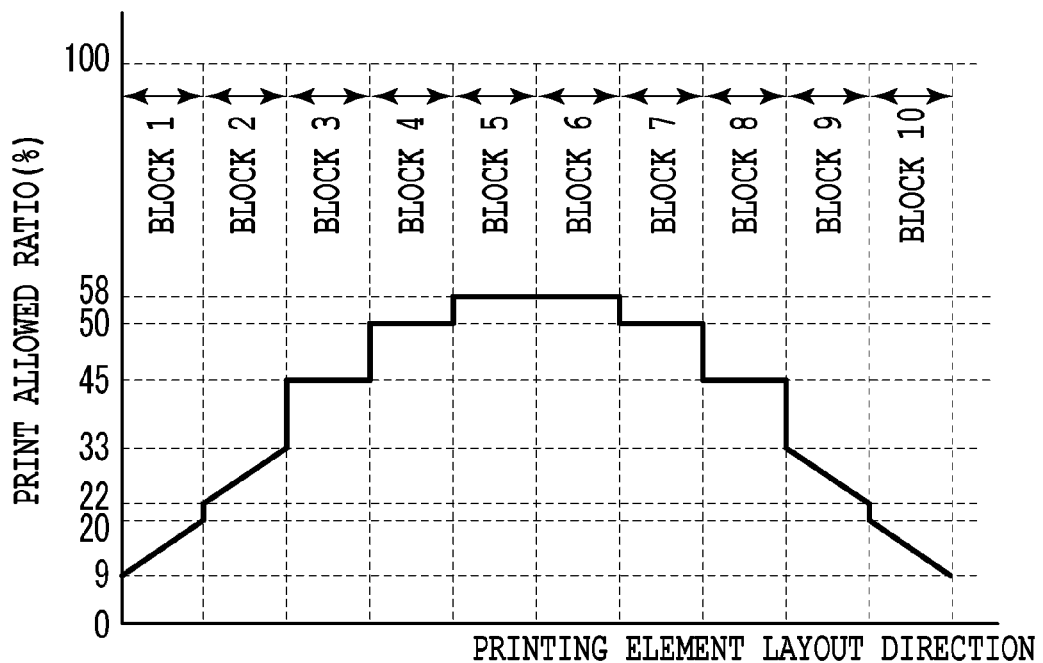

FIGS. 10A and 10B illustrate exemplary distributions of allowed printing ratios in a mask pattern usable with this embodiment. FIG. 10A illustrates the mask pattern 40 described with FIG. 9A. In contrast, FIG. 10B illustrates an example in which the print allowed ratios near the edges are kept low while also keeping their rate of change as gradual as possible, similarly to the earlier embodiments.

As described above, according to this Example, a mask pattern 40 is prepared such that a complementary relationship is obtained among blocks 1, 5, and 9, blocks 2, 6, and 10, blocks 3 and 7, and blocks 4 and 8, respectively. In addition, by using these blocks, it becomes possible to realize 10-pass multi-pass printing while conducting 4-column thinning.

Other Applications

The first to third embodiments described above are examples of a printing method in which the multi-pass number P is not limited to being a multiple of the column thinning number M. Hereinafter, the features shared by these embodiments will be described more generally. In P-pass multi-pass printing with M-column thinning, a mask pattern having a size in the Y direction that corresponds to the number of printing elements in use is prepared, and the mask pattern is divided into blocks 1 to P. Then, if R(x) is taken to be the mask pattern for the region corresponding to block x (where x=1 to P), there is a condition stipulating that these P block mask patterns satisfy the following condition. Namely, for all integers s obtainable between the values from 1 to M, the arrangements of printing pixels should exist in a complementary relationship with each other in the combination of mask patterns R(s), R(s+M), R(s+2M), . . . , R(s+N×M). Here, for all s, N is taken to be the largest integer satisfying s+N×M≤P.

Several additional examples that satisfy the above condition will now be given for illustrative purposes.

For example, when the column thinning number M=2 and the multi-passes number P=3, the printing element lines in use are divided by thirds into first to third blocks, and block mask patterns R(1), R(2), and R(3) are obtained. If the above condition is applied to this example, s may take a value of 1 or 2. Then, when s=1 it is sufficient that the mask patterns R(1) and R(3) exist in a complementary relationship and the mask pattern R(2) has an allowed printing ratio of 100% by itself. Such a mask pattern 50 and its distribution of print allowed ratios is illustrated in FIG. 11A.

Meanwhile, when the column thinning number M=8 and the multi-pass number P=14, the printing element lines in use are divided by fourteenths into first to fourteenth blocks, and block mask patterns R(1) to R(14) are obtained. If the above condition is applied to this example, s may take a value from 1 to 8. Then, it is sufficient for R(1) and R(9) when s=1, R(2) and R(10) when s=2, R(3) and R(11) when s=3, R(4) and R(12) when s=4, R(5) and R(13) when s=5, R(6) and R(14) when s=6, and R(7) and R(14) when s=7 to exist in respective complementary relationships while R(8) has an allowed printing ratio of 100% by itself. Such a mask pattern 60 and its distribution of print allowed ratios is illustrated in FIG. 11B.

Fourth Embodiment

Hereinafter, a method of correcting displacement of printing element lines in the Y direction (Y displacement correction) while using a mask pattern having the features discussed above will be described.

In the case where printing element lines for four colors are arranged in a print head 100 as in FIG. 1, or in the case where multiple print heads are mounted onto the carriage 106, displacement may occur in the position of each printing element line in the Y direction due to errors in manufacturing or errors during attachment to the carriage 106. In such cases, if the printing element lines for each color are used to print dots at equivalent positions in the data, these dots may become displaced in the Y direction, and the desired image may not be obtained.

Against such problems, Japanese Patent Laid-Open No. H06-135008 (1994), for example, discloses a method of shifting the data to be printed by individual printing elements in a printing element line according to the displacement magnitude of the printing element line.

FIG. 12 is a schematic diagram for giving a simplified description of the above method. A printing element line 1 and a printing element line 2 are arranged in parallel, but in this case are displaced by one pixel (i.e., one printing element) in the Y direction, as illustrated in FIG. 12. If printing is conducted in this state, dots printed by the leading printing elements in the respective printing element lines 1 and 2 will be printed displaced by one pixel in the Y direction, and the desired hue may not be obtained.

In order to avoid such a printed state, in Japanese Patent Laid-Open No. H06-135008 (1994) the data associated with the respective printing elements in the printing element line 1 is shifted by one pixel in the −Y direction. Thus, the data that was to be printed by the leading printing element is printed by the second printing element, and the print positions of the printing element line 1 and the printing element line 2 can be aligned in the Y direction.

However, in the case where the mask pattern in use is associated with the print positions of binary image data as in Japanese Patent Publication No. 4502362, the positional relationship between image data and mask pattern collapses if Y displacement correction like that of Japanese Patent Laid-Open No. H06-135008 (1994) is conducted, and the desired image may no longer be obtained. Thus, in the case of conducting the Y displacement correction of Japanese Patent Laid-Open No. H06-135008 (1994) while conducting image processing like that of Japanese Patent Publication No. 4502362, it becomes necessary to shift both the mask pattern and the image data with respect to the printing elements. In this case, it becomes necessary to maintain the positional relationship between the mask pattern and the image data while also maintaining complementary relationships in the mask pattern.

Figure 13:
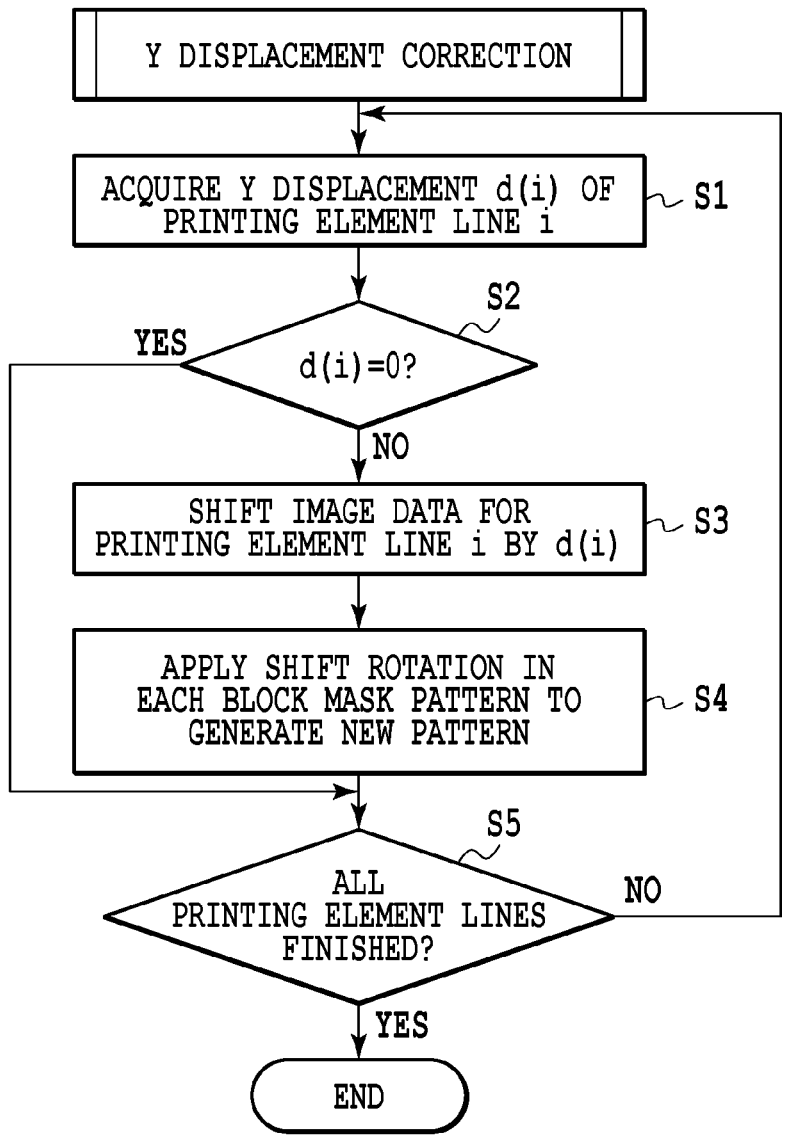
FIG. 13 is a flowchart for when a printing controller executes Y displacement correction.
Figure 14A:
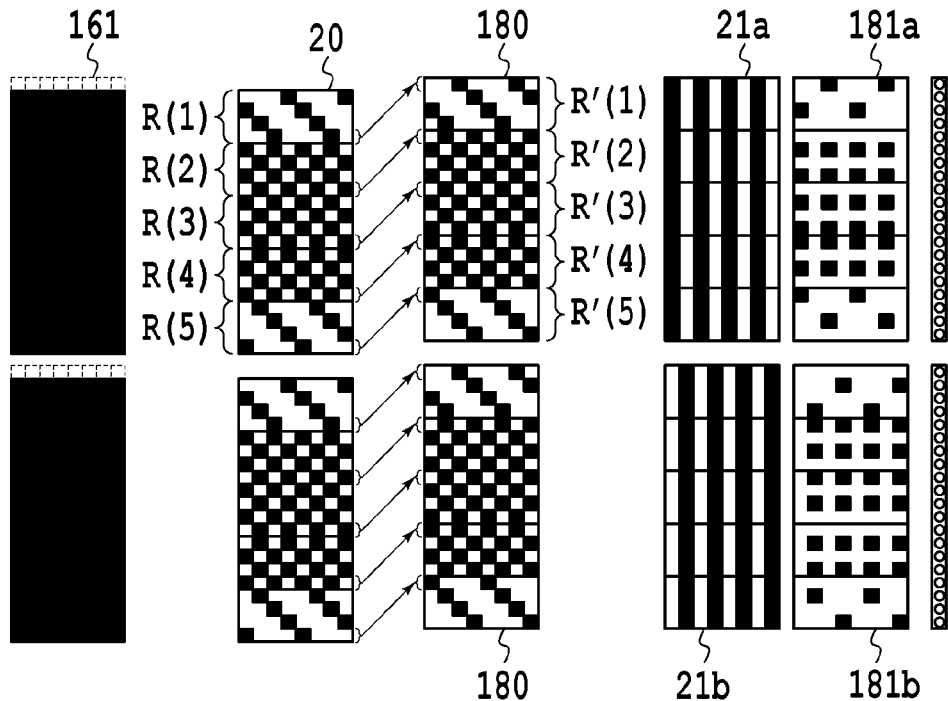
FIGS. 14A and 14B illustrate states of multi-pass printing in the fourth embodiment.
Figure 14B:
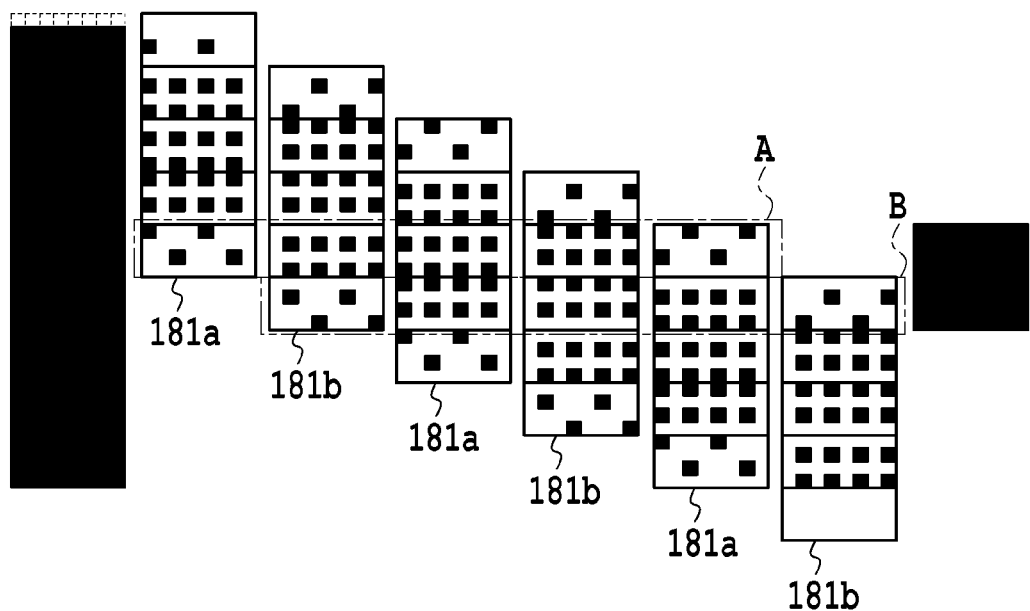

FIG. 13 is a flowchart illustrating processing steps for when the printing controller 500 executes Y displacement correction. Referring once again to FIG. 3, in this embodiment such Y displacement correction is conducted between the quantization process s 1009 and the mask process 1020 in the printing controller 500 of the printing apparatus. FIGS. 14A and 14B illustrate states in which image data and a mask pattern are corrected in accordance with the processing steps in FIG. 13.

When the process in FIG. 13 starts, first in step S1 the printing controller 500 controls the head discrimination signal generator circuit 406 to acquire the Y direction print position displacement d(i) for the ith printing element line from among the multiple printing element lines. The print position displacements d(i) for the individual printing element lines may be measured and stored in a storage means of the print head before the print head is shipped, or acquired by a given mode when installing the print head in the printing apparatus. The print position displacement d(i) in this case is a value quantized in units of ±1 pixels. Herein, the case where d(i)=+1 will be described.

Next, in step S2, it is determined whether or not the print position displacement d(i)=0. The process jumps to step S6 in the case where d(i)=0, since Y displacement correction with respect to the printing element line i is unnecessary. On the other hand, the process proceeds to step S3 in the case where d(i)=0 is false.

In step S3, the data stored with respect to the printing element line i is shifted in the Y direction by −d(i). FIG. 14A demonstrates how print data 161 shifted by −1 pixel is generated.

In the following step S4, a shift rotation by −d(i) pixels each is applied to the respective block mask patterns R(1) to R(P) to generate new block mask patterns R'(1) to R'(P). In FIG. 14A, since d(i)=1, the rasters in each of the five block mask patterns are shifted by one raster such that the first through third rasters becomes the second through fourth rasters, while the fourth raster is moved to the first raster. By generating a new mask pattern in this way, the distribution of pixels allowed to be printed may differ in the new mask pattern 180, but the print allowed ratios in each block will be equal to those of the original mask pattern 20, and the complementary relationships will be maintained. In other words, in the newly generated mask pattern 180, the print allowed ratios in blocks 1 to 5 become 25%, 50%, 50%, 50%, and 25%, with blocks 1, 3, and 5 as well as blocks 2 and 4 respectively existing in complementary relationships.

The printing controller in this embodiment conducts the mask process 1020 using the mask pattern 180 newly generated in this way, and additionally executes the column thinning process 1030. When conducting the column thinning process 1030, scans that print on odd columns 21a and scans that print on even columns 21b are repeatedly performed in alternation. Thus, the pattern that is actually printed by the odd scans becomes the pixel pattern 181a, while the pattern that is actually printed by the even scans becomes the pixel pattern 181b.

FIG. 14B illustrates how an image is printed on a print medium by 5-pass multi-pass printing using the newly generated mask pattern 180. The print scans are alternated in accordance with the pixel patterns 181a and 181b, and conveyance operations equivalent to four pixels are conducted between the individual print scans. Likewise in this embodiment, although the number of scans in which odd column data is printed and the number of scans in which even column data is printed differ between the mutually adjacent regions A and B, in both cases 100% of the odd column data and 100% of the even column data is printed. In this way, according to this embodiment, multi-pass printing in which the multi-pass number (P=5) is not a multiple of the column thinning number (M=2) can be realized while also applying Y displacement correction.

Note that although the above describes a method of applying a shift rotation corresponding to the print position displacement d(i) in each block, the method of generating a new mask pattern is not limited to this method. As discussed earlier, the present invention is still effective insofar as complementary relationships are maintained among combinations of block mask patterns that print on the same columns.

Figure 15A:
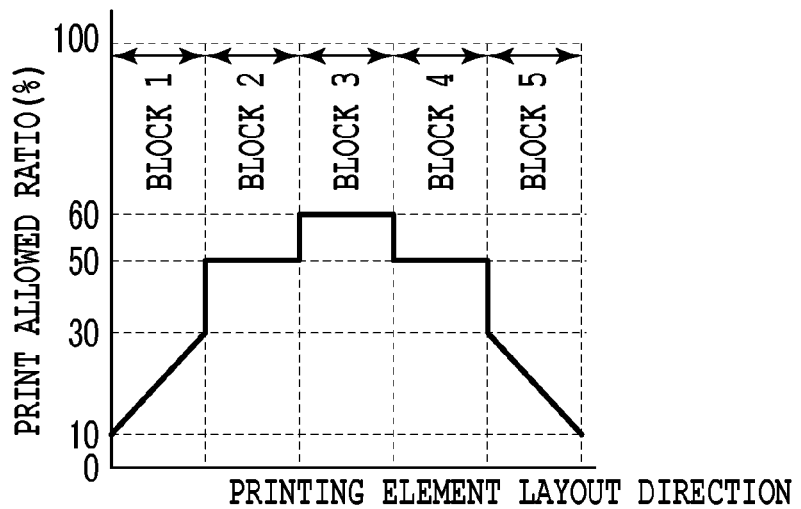
FIGS. 15A to 15C illustrate mask patterns generated for Y displacement correction.
Figure 15B:
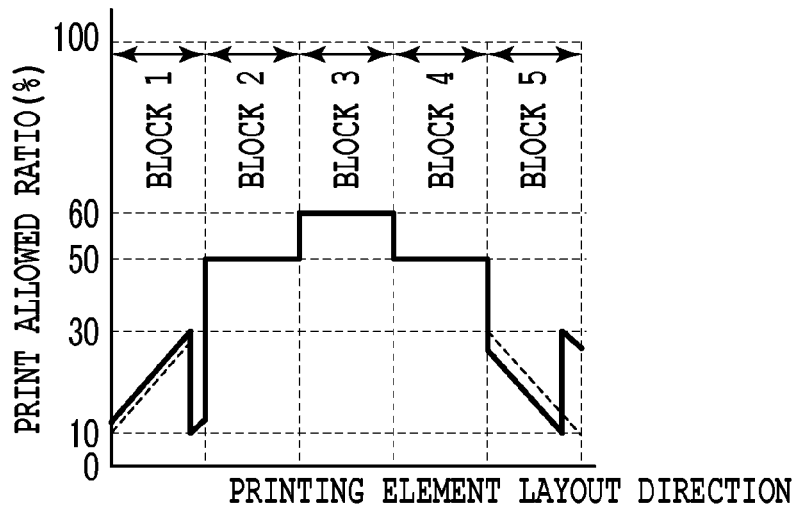
Figure 15C:
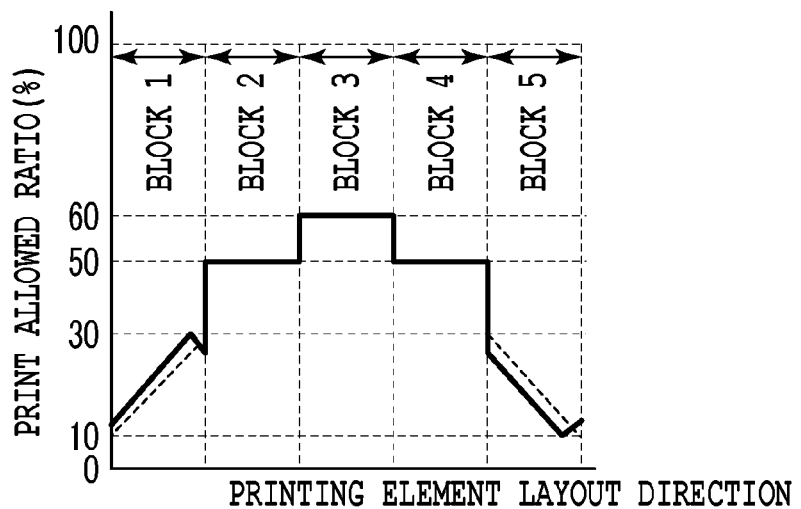

FIGS. 15A to 15C illustrate mask patterns generated with methods that differ from the above example. FIG. 15A illustrates a mask pattern equivalent to FIG. 5C, a mask pattern that realizes 5-pass multi-pass printing with 2-column thinning. If a shift rotation is applied to this mask pattern within each block mask pattern as described above, the distribution of print allowed ratios becomes like that of FIG. 15B. According to FIG. 15B, sites are produced in blocks 1 and 5 where the print allowed ratio changes sharply.

Typically, in a mask pattern where the print allowed ratio changes, it is preferable for that change to be as smooth as possible in the layout direction of the printing elements. If a mask pattern with sharply changing print allowed ratios is used to print, there is a risk of noticeable lines or banding at the positions where the print allowed ratios change sharply.

Figure 16A:
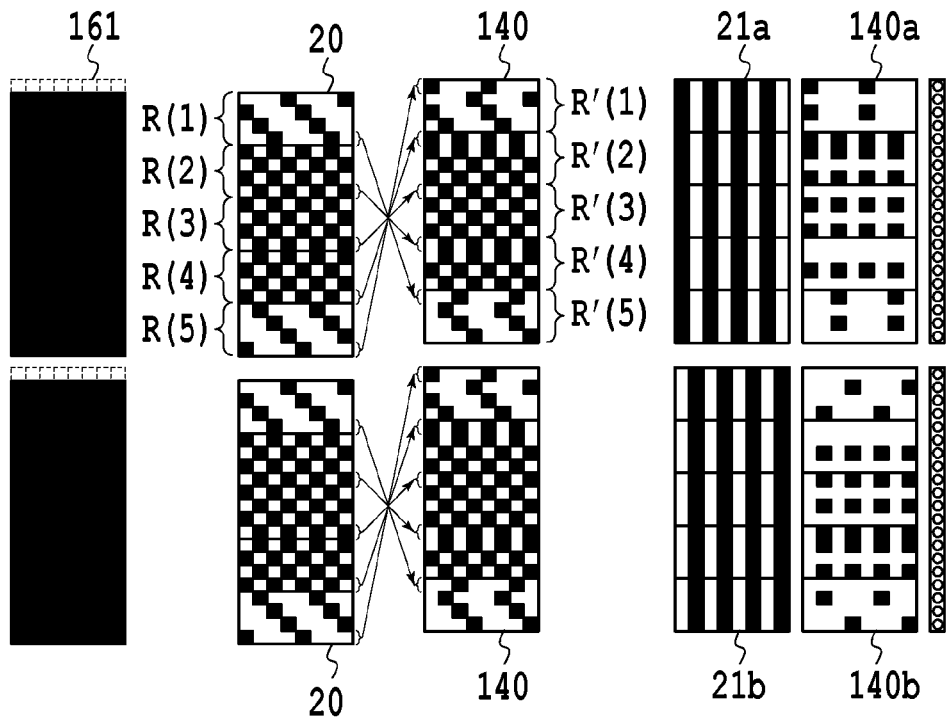
FIGS. 16A and 16B illustrate another example of the fourth embodiment.
Figure 16B:
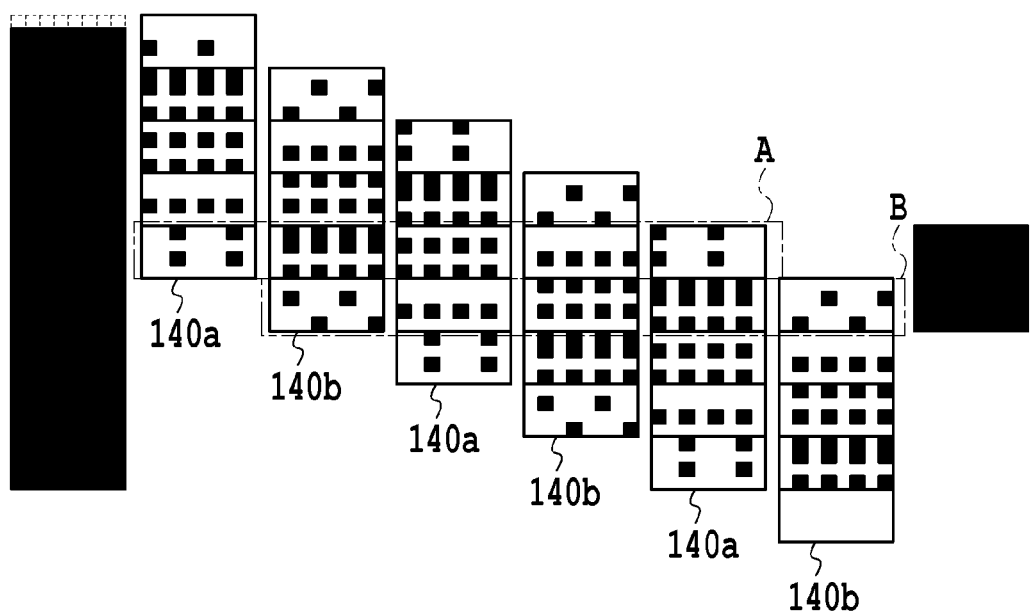

FIGS. 16A and 16B illustrate another example in which image data and a mask pattern are corrected in accordance with the processing steps in FIG. 13.

In this example, symmetries in the print allowed ratio distribution of the original mask pattern are utilized to shift the mask data when generating a new mask pattern. Specifically, in the case where d(i)=1, the rasters in each of the block mask patterns are shifted by one raster such that the first through third rasters becomes the second through fourth rasters. In addition, the fourth raster is shifted to the raster data at the symmetric position of the mask pattern in the Y direction. In other words, the fourth raster in block 1 is shifted to the first raster in block 5, while the fourth raster in block 2 is shifted to the first raster in block 4. Also, the fourth raster in block 3 is shifted to the first raster in block 3, the fourth raster in block 4 is shifted to the first raster in block 2, and the fourth raster in block 5 is shifted to the first raster in block 1.

Generating a new mask pattern with such a method still maintains the complementary relationship of the blocks 1, 3, and 5 as well as the complementary relationship of blocks 2 and 4. Additionally, 100% of the odd column data and 100% of the even column data can be printed in the regions A and B, as illustrated in FIG. 16B. The print allowed ratio distribution for this example is illustrated in FIG. 15C.

As already described, with an original mask pattern used in the present invention, combinations of block mask patterns that print on the same columns have a complementary relationship. Additionally, in such a mask pattern, the complementary relationships are still maintained among complementary blocks even if the mask data for corresponding rasters are exchanged. For example, since the blocks 1, 3, and 5 are in a complementary relationship in the mask pattern 20 illustrated in FIG. 14A and FIG. 16A, their nth rasters may be exchanged in any way while still maintaining the complementary relationship. Similarly, since the blocks 2 and 4 are in a complementary relationship, their nth rasters may be exchanged in any way while still maintaining the complementary relationship. In other words, in this embodiment, utilizing such relationships makes it possible to substitute respective rasters in the mask pattern to make the variation of print allowed ratios as gradual as possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-018351, filed Jan. 31, 2012, which is hereby incorporated by reference herein in its entirety.

What is claimed is:

1. An inkjet printing apparatus comprising:
    an obtaining unit configured to obtain a first print pixel pattern and a second print pixel pattern, each of which defines print allowed pixels, where the printing of a dot is allowed, and print non-allowed pixels, where the printing of a dot is not allowed, for a printing element line in which a plurality of ink ejecting elements are arranged in a sub-scan direction, wherein the first and second print pixel patterns correspond to 1 to P blocks (where P is an integer satisfying 3≤P) of the printing element line that are obtained by dividing the printing element line in the sub-scan direction into P divisions;
    a print unit configured to execute M times print scans (where M is an integer satisfying 2≤M<P and not a divisor of P) wherein a first print scan is performed according to the first print pixel pattern for printing a first column of M columns while moving the printing element line in a main scan direction crossing the sub-scan direction and a second print scan is performed according to the second print pixel pattern for printing a second column that is different from the first column of the M columns while moving the printing element line in a main scan direction crossing the sub-scan direction; and
    a conveying unit configured to convey a print medium in the sub-scan direction by a distance equivalent to one of the blocks between the print scans;
    wherein different columns of the M columns are printed by different scans of the M times scans by performing each of the M times scans according to different print pixel patterns, and
    wherein, for each integer s satisfying 1≤s<M, print pixel patterns of (s+N×M)-th blocks in the print pixel pattern respectively corresponding to all integers N satisfying 0≤N and s+N×M≤P have a complementary relationship with each other in the arrangements of the print allowed pixels for the first columns and, for each integer s satisfying 1≤s<M, print pixel patterns of (s+N×M)-th blocks in the second print pixel pattern respectively corresponding to all integers N satisfying 0≤N and s+N×M≤P have a complementary relationship with each other in the arrangements of the print allowed pixels for the second columns.

2. The ink jet printing apparatus according to claim 1, wherein the first print pixel pattern and the second print pixel pattern are constructed such that different columns are allowed to be printed at (M−1) columns interval and the print unit prints according to the first print pixel pattern at the first scan and prints according to the second print pixel pattern at the second print scan.

3. The ink jet printing apparatus according to claim 2, wherein a plurality of print pixel patterns, including the first print pixel pattern and the second print pixel pattern, that allow different columns to be printed from each other are prepared and, regarding each of the plurality of print pixel patterns, for each integer s satisfying 1≤s<M, print pixel patterns of (s+N×M)-th blocks in the print pixel pattern corresponding to all integers N satisfying 0≤N and s+N×M≤P have a complementary relationship with each other in the arrangements of the print allowed pixels for print allowed columns in the print pixel pattern.

4. The inkjet printing apparatus according to claim 1, wherein the P is 5 and the M is 2.

5. The inkjet printing apparatus according to claim 1, wherein the P is 7 and the M is 2.

6. The inkjet printing apparatus according to claim 1, wherein the P is 10 and the M is 4.

7. The inkjet printing apparatus according to claim 1, wherein the M is 2, 4, or 8.

8. The inkjet printing apparatus according to claim 1, further comprising:
    an acquiring unit configured to acquire print position displacement amount of the printing element line with respect to the sub-scan direction;
    a data shifting unit configured to shift the image data to be printed by the respective printing elements included in the printing element line according to the print position displacement amount; and
    a generating unit configured to generate new print pixel patterns by shifting the arrangement of the print allowed pixels and the print non-allowed pixels in the first print pixel pattern and the second print pixel pattern, respectively, according to the print position displacement amount.

9. The inkjet printing apparatus according to claim 8, wherein the generating unit generates the new print pixel patterns by shifting the arrangement of the print allowed pixels and the print non-allowed pixels within each of regions corresponding to the P blocks of the first print pixel pattern and the second print pixel pattern according to the print position displacement amount.

10. The inkjet printing apparatus according to claim 8, wherein the generating unit generates the new print pixel patterns by shifting the arrangement of the print allowed pixels and the print non-allowed pixels in the first print pixel pattern and the second print pixel pattern according to the print position displacement amount such that variation in the print allowed ratios of the individual printing elements is decreased.

11. The inkjet printing apparatus according to claim 1, wherein the print allowed ratios at the edges of the first print pixel pattern and the second print pixel pattern in the layout direction of the printing elements is lower than the print allowed ratios in the centers.

12. The inkjet printing apparatus according to claim 1, wherein in at least one region corresponding to one block of the first print pixel pattern and the second print pixel pattern, the print allowed ratio at a side of the center of the printing element line is relatively higher than at a side of the edge of the printing element line.

13. The inkjet printing apparatus according to claim 1, wherein the print unit performs mask process for executing logical product between the first print pixel pattern and input image data to generate a first print data and then executes the first print scan according to the first print data for the first column and performs mask process for executing logical product between the second print pixel pattern and the input image data to generate a second print data and then executes the second print scan according to the second print data for the second column.

14. An inkjet printing method for an inkjet printing apparatus comprising the steps of:
obtaining a first print pixel pattern and a second print pixel pattern, from a storing unit, each of which defines print allowed pixels, where the printing of a dot is allowed, and print non-allowed pixels, where the printing of a dot is not allowed, for a printing element line in which a plurality of ink ejecting elements are arranged in a sub-scan direction, wherein the print pixel patterns correspond to 1 to P blocks (where P is an integer satisfying 3≤P) of the printing element line that are obtained by dividing the printing element line in the sub-scan direction into P divisions;
printing by executing M times print scans (where M is an integer satisfying 2≤M<P and not a divisor of P) wherein a first print scan is performed according to the first print pixel pattern for printing a first column of M columns while moving the printing element line in a main scan direction crossing the sub-scan direction and a second print scan is performed according to the second print pixel pattern for printing a second column that is different from the first column of the M columns while moving the printing element line in a main scan direction crossing the sub-scan direction; and
conveying a print medium in the sub-scan direction by a distance equivalent to one of the blocks between the print scans;

wherein different columns of the M columns are printed by different scans of the M times scans by performing each of the M times scans according to different print pixel patterns, and
wherein, for each integer s satisfying 1≤s<M, print pixel patterns of (s+N×M)-th blocks in the print pixel pattern respectively corresponding to all integers N satisfying 0≤N and s+N×M≤P have a complementary relationship with each other in the arrangements of the print allowed pixels for the first columns and, for each integer s satisfying 1≤s<M, print pixel patterns of (s+N×M)-th blocks in the second print pixel pattern respectively corresponding to all integers N satisfying 0≤N and s+N×M≤P have a complementary relationship with each other in the arrangements of the print allowed pixels for the second columns.

15. The ink jet printing method according to claim 14, wherein the first print pixel pattern and the second print pixel pattern are constructed such that different columns are allowed to be printed at (M−1) columns interval and the print step prints according to the first print pixel pattern at the first print scan and prints according to the second print pixel pattern at the second print scan.

16. The ink jet printing method according to claim 15, wherein a plurality of print pixel patterns, including the first print pixel pattern and the second print pixel pattern, that allow different columns to be printed from each other are prepared and, regarding each of the plurality of print pixel patterns, for each integer s satisfying 1≤s<M, print pixel patterns of (s+N×M)-th blocks in the print pixel pattern corresponding to all integers N satisfying 0≤N and s+N×M≤P have a complementary relationship with each other in the arrangements of the print allowed pixels for print allowed columns in the print pixel pattern.

17. The inkjet printing method according to claim 14, wherein the P is 5 and the M is 2.

18. The inkjet printing method according to claim 14, wherein the P is 7 and the M is 2.

19. The inkjet printing method according to claim 14, wherein the P is 10 and the M is 4.

20. The inkjet printing method according to claim 14, wherein the M is 2, 4, or 8.

21. The inkjet printing method according to claim 14, further comprising the steps of:
acquiring print position displacement amount of the printing element line with respect to the sub-scan direction;
shifting the image data to be printed by the respective printing elements included in the printing element line according to the print position displacement amount; and
generating new print pixel patterns by shifting the arrangement of the print allowed pixels and the print non-allowed pixels in the first print pixel pattern and the second print pixel pattern, respectively, according to the print position displacement amount.

22. The inkjet printing method according to claim 21, wherein the generating step generates the new print pixel patterns by shifting the arrangement of the print allowed pixels and the print non-allowed pixels within each of regions corresponding to the P blocks of the first print pixel pattern and the second print pixel pattern according to the print position displacement amount.

23. The inkjet printing method according to claim 21, wherein the generating step generates the new print pixel patterns by shifting the arrangement of the print allowed pixels and the print non-allowed pixels in the first print pixel pattern and the second print pixel pattern according to the print position displacement amount such that variation in the print allowed ratios of the individual printing elements is decreased.

24. The inkjet printing method according to claim 14, wherein the print allowed ratios at the edges of the first print pixel pattern and the second print pixel pattern in the layout direction of the printing elements is lower than the print allowed ratios in the centers.

25. The inkjet printing method according to claim 14, wherein in at least one region corresponding to one block of the first print pixel pattern and the second print pixel pattern, the print allowed ratio at a side of the center of the printing element line is relatively higher than that at a side of the edge of the printing element line.

26. The inkjet printing method according to claim 14, wherein, in the printing step, mask process for executing logical product between the first print pixel pattern and input image data to generate a first print data is performed and then the first print scan is executed according to the first print data for the first column and mask process for executing logical product between the second print pixel pattern and input image data to generate a second print data is performed and then the second print scan is executed according to the second print data for the second column.

* * * * *